United States Patent
Taima

(10) Patent No.: US 9,883,072 B2
(45) Date of Patent: Jan. 30, 2018

(54) ENCRYPTED FILE PRINTING SYSTEM, ENCRYPTED FILE PRINTING METHOD, AND ENCRYPTED FILE PRINT CONTROL PROGRAM

(71) Applicant: Konica Minolta, Inc., Tokyo (JP)

(72) Inventor: Katsuyuki Taima, Hiratsuka (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/370,133

(22) Filed: Dec. 6, 2016

(65) Prior Publication Data

US 2017/0163841 A1    Jun. 8, 2017

(30) Foreign Application Priority Data

Dec. 7, 2015    (JP) .................................. 2015-238302

(51) Int. Cl.
*H04N 1/32* (2006.01)
*H04N 1/44* (2006.01)
*H04N 1/00* (2006.01)
*G06K 15/02* (2006.01)
(Continued)

(52) U.S. Cl.
CPC ..... *H04N 1/32272* (2013.01); *G06K 15/1823* (2013.01); *H04L 9/0861* (2013.01); *H04L 9/3226* (2013.01); *H04N 1/00344* (2013.01); *H04N 1/444* (2013.01);
(Continued)

(58) Field of Classification Search
CPC ........... H04N 1/32272; H04N 1/00344; H04N 1/444; H04N 2201/0094; H04N 2201/3228; H04N 2201/3281; H04L 9/0861; H04L 9/3226; G06K 15/1823
See application file for complete search history.

(56) References Cited

U.S. PATENT DOCUMENTS 7,913,296 B2 *   3/2011   Shigeeda .............. H04L 9/3213
                                                                726/5
2004/0085558 A1 *   5/2004   Minns .................... G06F 3/1205
                                                                358/1.11

(Continued)

FOREIGN PATENT DOCUMENTS

JP    2006-185053 A    7/2006
JP    2008-093903 A    4/2008
JP    2011-213098 A    10/2011

*Primary Examiner* — Ming Hon
(74) *Attorney, Agent, or Firm* — Baker & Hostetler LLP

(57) ABSTRACT

An encrypted file printing system includes: a client terminal configured to generate a print file; an authorization management server configured to manage authorization of the print file; and an image forming apparatus configured to perform printing of the print file, the client terminal, the authorization management server, and the image forming apparatus being connected by a communication network, wherein the authorization management server includes: a key generating unit; and a decrypting unit, the client terminal includes: an encrypting unit; and a print instructing unit, the image forming apparatus includes: a decrypting unit; a rasterizing unit; a memory; and a control unit, and the control unit includes: a complexity calculating unit; a processing time calculating unit configured to calculate a first processing time in a first processing mode and a second processing time in a second processing mode; and a decryption destination determining unit.

18 Claims, 13 Drawing Sheets

(51) Int. Cl.
*H04L 9/08* (2006.01)
*H04L 9/32* (2006.01)

(52) U.S. Cl.
CPC ........... *H04N 2201/0094* (2013.01); *H04N 2201/3228* (2013.01); *H04N 2201/3281* (2013.01)

(56) References Cited

U.S. PATENT DOCUMENTS

| | | | | |
|---|---|---|---|---|
| 2006/0002628 A1* | 1/2006 | Dolan | ................ | G06K 9/00456 382/286 |
| 2008/0148353 A1* | 6/2008 | Dohi | .................... | G06F 21/608 726/2 |
| 2009/0284785 A1* | 11/2009 | Bando | .................. | G06F 21/608 358/1.15 |
| 2010/0245890 A1* | 9/2010 | Chakraborty | ......... | G06F 3/1204 358/1.15 |
| 2014/0355039 A1* | 12/2014 | Tsujimoto | ............. | G06F 3/1204 358/1.14 |
| 2015/0160900 A1* | 6/2015 | Kang | .................... | G06F 3/1222 358/1.14 |

\* cited by examiner

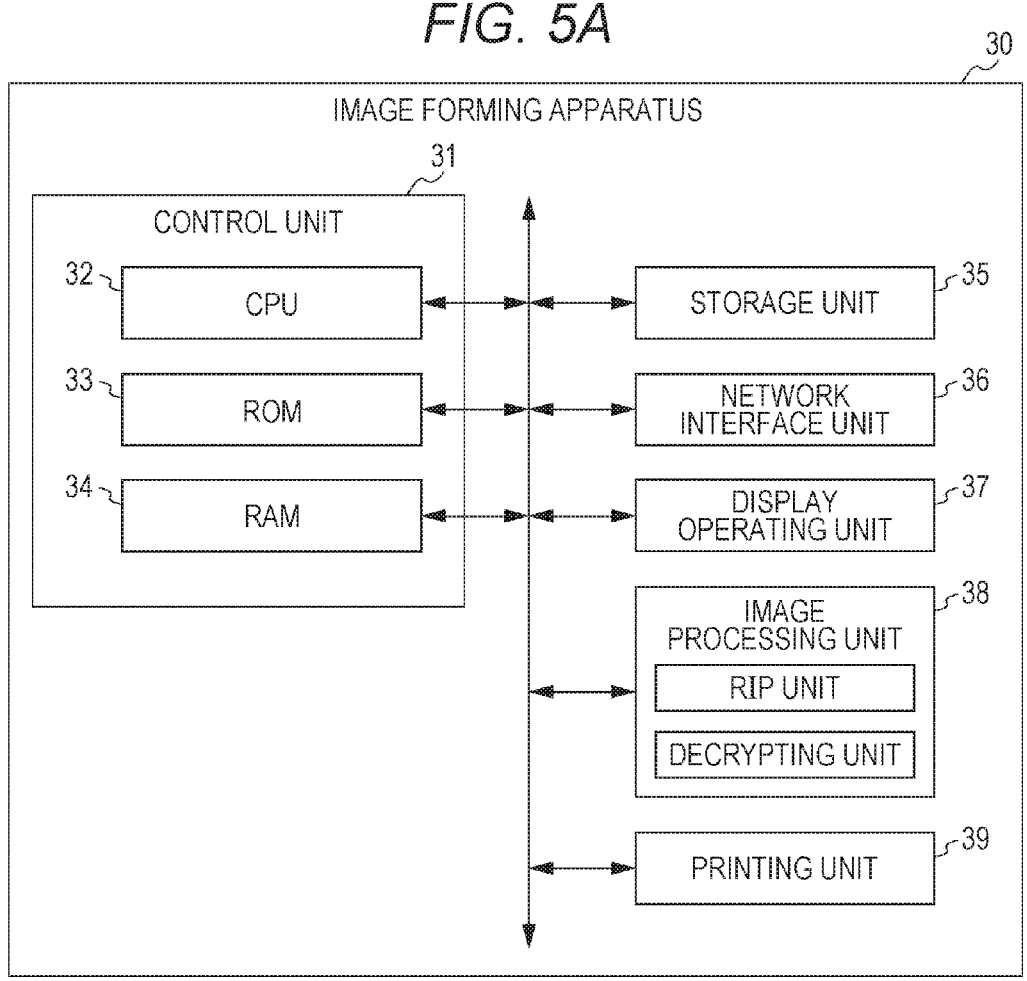
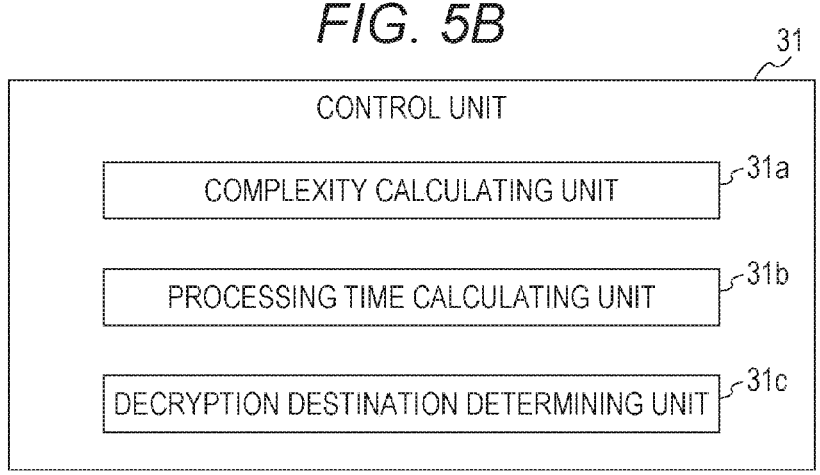

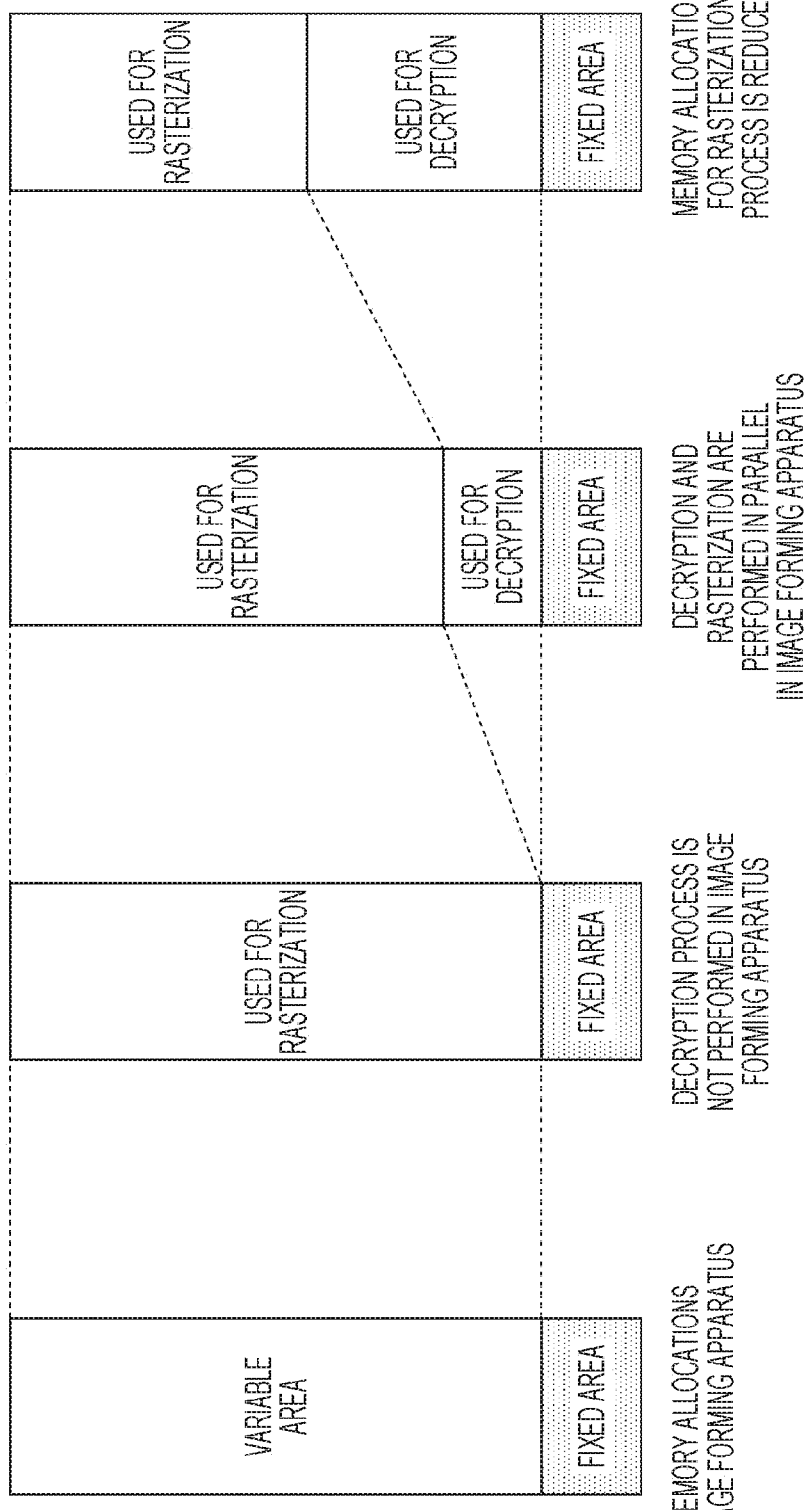

FIG. 10

| ITEM | VALUE |
|---|---|
| AUTHORIZATION MANAGEMENT SERVER (SPECIFIC VALUE) | 63.8 |
| RIP CONTROLLER (SPECIFIC VALUE) | 28.9 |
| RASTERIZATION COMPLEXITY | 3 |

FIG. 11

| OBJECT TYPE IN FILE | FILE COMPLEXITY | NUMBER OF PAGES |
|---|---|---|
| ONLY TEXT | 1 | 10 |
| ONLY GRAPHICS, OR TEXT+GRAPHICS | 2 | 40 |
| CONTAINING IMAGE | 3 | 30 |
| VDP WITHOUT IMAGE | 4 | 0 |
| VDP WITH IMAGE | 5 | 0 |

FIG. 12

| FILE/OBJECT TYPE | FILE COMPLEXITY | |
|---|---|---|
| | PRINTER 1 | MFP 1 |
| ONLY TEXT | 1 | 1 |
| ONLY GRAPHICS, OR TEXT+GRAPHICS | 2 | 2 |
| CONTAINING IMAGE | 3 | 3 |
| VDP WITHOUT IMAGE | 4 | 2 |
| VDP WITH IMAGE | 5 | 3 |

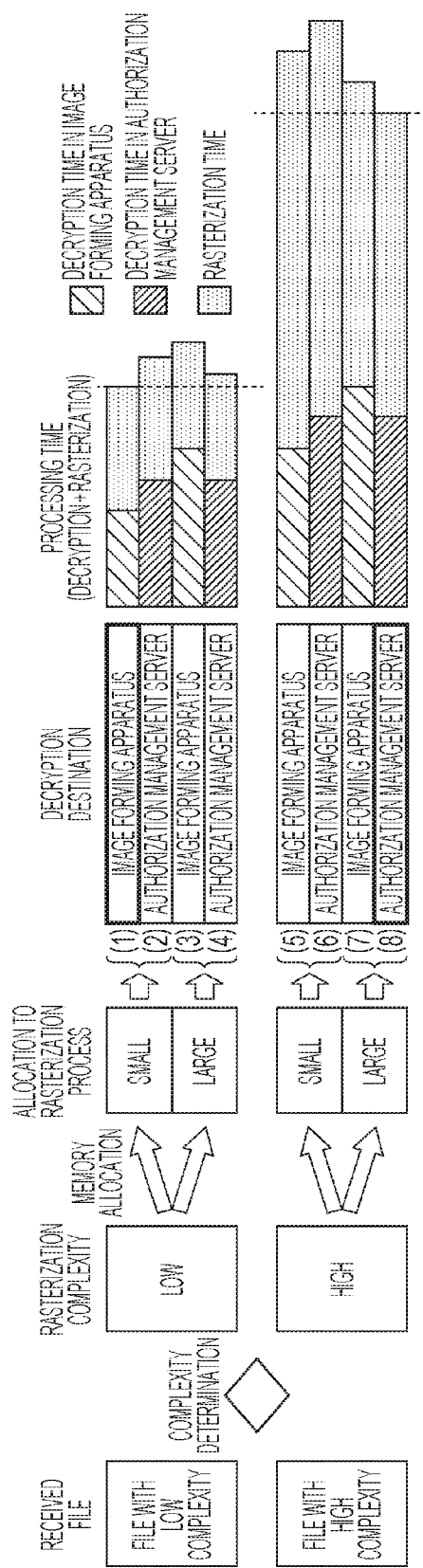

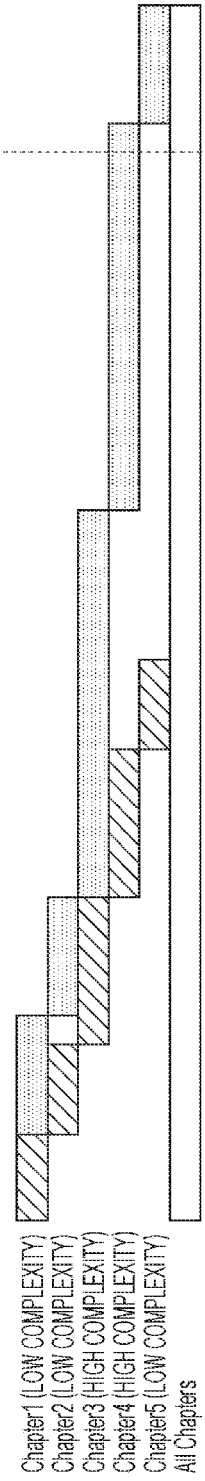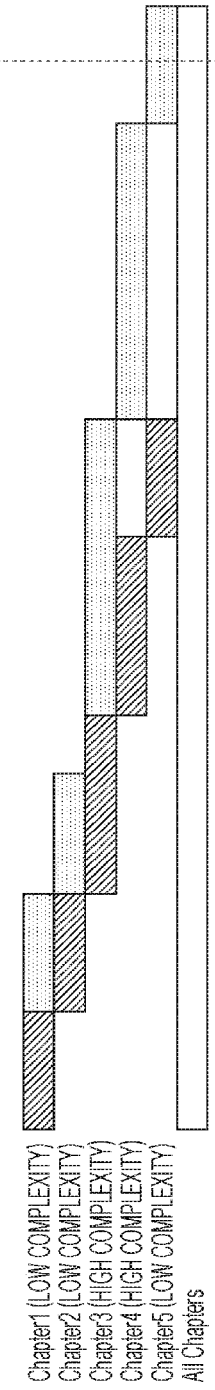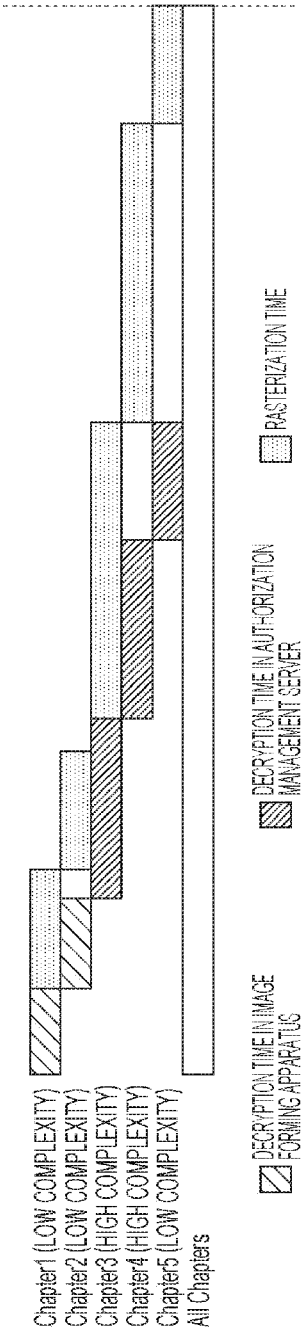

ENCRYPTED FILE PRINTING SYSTEM, ENCRYPTED FILE PRINTING METHOD, AND ENCRYPTED FILE PRINT CONTROL PROGRAM

CROSS-REFERENCE TO RELATED APPLICATIONS

This U.S. patent application is entitled to and claims the benefit of Japanese Patent Application No. 2015-238302, filed on Dec. 7, 2015, the entire contents of which, including the description, claims, drawings, and abstract is incorporated herein by reference in its entirety.

BACKGROUND OF THE INVENTION

Field of the Invention

The present invention relates to an encrypted file printing system, an encrypted file printing method, and an encrypted file print control program, and more particularly, relates to an encrypted file printing system that performs printing after decrypting and rasterizing an encrypted file, an encrypted file printing method, and an encrypted file print control program.

Description of the Related Art

Example printing methods to be implemented in image forming apparatuses such as multi-functional peripherals (MFP) and printers include a printing method by which a special-purpose printer driver is installed into a client PC, and printing is performed with an application such as Office (a registered trade name) of Microsoft or Adobe Reader (a registered trade name) of Adobe Systems, and a printing method by which a file in a format compatible with direct printing, such as OOXML (Office Open XML), ODF (OpenDocument Format), or PDF (Portable Document Format) (in the description below, PDF is used), is transmitted directly to MFP or a printer without the use of any application, and then, printing is performed.

As the demand for security has been increasing recently, files such as PDF files are not protected only with passwords, but are protected by a technology called Rights Management System (RMS). RMS is to encrypt a file by adding authorization information called policy about each user to the file, inquire of an authorization management server about the authorization information through an application in a client PC when a user accesses the file from the client PC, cancel the encryption and allow viewing if viewing is authorized, and set, for each user, restrictions on functions such as editing and printing according to the policy. In a case where any printing authority has not been given to a user who is viewing, the print button is shown in gray to prohibit printing from an application. In a case where the printing authority has been given to the user, the print button is shown in a normal state to allow printing from an application.

In a case where a file protected with a technology such as the above-described RMS is to be transmitted directly to MFP or a printer and be subjected to direct printing, the file not only needs to be processed according to the policy, but also needs to be decrypted before rasterized and converted into image data.

As for printing that uses an encrypted file but is not related to direct printing of an encrypted file, for example, JP 2008-93903 A discloses an image information processing system that includes: a portable removable large-capacity storage device that characteristically includes a disk controller unit that controls at least a large-capacity storage device, an encrypting/decrypting unit, a user authenticating unit, and a nonvolatile memory unit; and an image information processing device on which the removable large-capacity storage device can be mounted.

JP 2006-185053 A discloses an image processing device that includes: an input unit that inputs print data; a generating unit that generates image data from the print data; a storing unit that stores the image data into a storage; a notifying unit that issues a notification about the generation state of the image data in the generating unit; and an output unit that outputs the stored image data in accordance with authentication information that has been input.

JP 2011-213098 A discloses a printing system that includes: a drawing/deploying unit that receives print data from a host, converts the print data into raster data, and allots a unique job ID to the raster data to turn the raster data into encoded data; a print control unit that obtains, from the drawing/deploying unit, encoding information indicating the load for performing encoding when the drawing/deploying unit generates the encoded data, determines the level of the speed in printing the raster data having the job ID allotted thereto, and reorders the sequence of the job IDs in a job sequence table that specifies the job print sequence in accordance with the levels of printing speeds; and a print engine unit that prints the raster data with the reordered job ID at the printing speed associated with the job ID.

When an encrypted file is decrypted (particularly, when complicated encryption incorporated into RMS is deciphered), a large load is put on the central processing unit (CPU). Therefore, in a case where the same control as that of the above-described application is simply performed by an image forming apparatus, printing performance degrades when decryption and rasterization are performed in parallel. Particularly, in the case of production printing where direct printing of a large-sized file or a file with a complicated structure is performed, the degradation of printing performance becomes a serious problem in terms of productivity.

Furthermore, since the file structure (such as the file size, the number of pages, and the file/object type) of an encrypted file is not clear unless the encrypted file is decrypted, the times to be required for a decryption process and a rasterization process cannot be calculated, and therefore, it is difficult to predict a required print time.

SUMMARY OF THE INVENTION

The present invention has been made in view of the above problems, and a main object is to provide an encrypted file printing system, an encrypted file printing method, and an encrypted file print control program that can improve performance in printing an encrypted file and shorten the time required for the printing.

To achieve the abovementioned object, according to an aspect, an encrypted file printing system reflecting one aspect of the present invention comprises: a client terminal configured to generate a print file; an authorization management server configured to manage authorization of the print file; and an image forming apparatus configured to perform printing of the print file, the client terminal, the authorization management server, and the image forming apparatus being connected by a communication network, wherein the authorization management server includes: a key generating unit configured to generate an encryption key for the print file and a decryption key for an encrypted file generated by encrypting the print file; and a decrypting unit configured to decrypt the encrypted file, the client terminal includes: an encrypting unit configured to encrypt the print file and generate the encrypted file, using the encryption key obtained from the authorization management server; and a print instructing unit configured to add file information as metadata to the encrypted file, to transmit the file information to the image forming apparatus, the file information indicating a structure of the print file, the image forming apparatus includes: a decrypting unit configured to decrypt the encrypted file; a rasterizing unit configured to rasterize the print file; a memory to be used by the decrypting unit and the rasterizing unit; and a control unit, and the control unit includes: a complexity calculating unit configured to receive the encrypted file, and read the file information added to the encrypted file and calculate a rasterization complexity in the image forming apparatus in accordance with the file information before the decrypting unit decrypts the encrypted file; a processing time calculating unit configured to calculate a first processing time in a first processing mode and a second processing time in a second processing mode in accordance with CPU performance information about the image forming apparatus and the authorization management server, information about an allocation of the memory to a rasterization process, the file information, and the rasterization complexity, the first processing mode being a mode where the image forming apparatus performs a decryption process and a rasterization process in parallel, the second processing mode being a mode where the authorization management server performs a decryption process and the image forming apparatus performs a rasterization process; and a decryption destination determining unit configured to compare the first processing time and the second processing time, and, in accordance with a result of the comparison, determine which one of the image forming apparatus and the authorization management server is to perform a decryption process.

To achieve the abovementioned object, according to an aspect, an encrypted file printing method implemented in a system in which a client terminal that generates a print file, an authorization management server that manages authorization of the print file, and an image forming apparatus that performs printing of the print file are connected by a communication network, reflecting one aspect of the present invention comprises: the authorization management server authorizing the print file in response to an authorization request from the client terminal, generating an encryption key for encrypting the print file, and transmitting the encryption key to the client terminal; the client terminal receiving the encryption key from the authorization management server, creating an encrypted file by encrypting the print file using the encryption key, adding file information indicating a structure of the print file as metadata to the encrypted file, and transmitting the encrypted file to the image forming apparatus; the image forming apparatus receiving the encrypted file, and reading the file information added to the encrypted file and calculating a rasterization complexity in the image forming apparatus in accordance with the file information before the encrypted file is decrypted; calculating a first processing time in a first processing mode and a second processing time in a second processing mode in accordance with CPU performance information about the image forming apparatus and the authorization management server, information about an allocation of a memory to a rasterization process, the file information, and the rasterization complexity, the first processing mode being a mode where the image forming apparatus performs a decryption process and a rasterization process in parallel, the second processing mode being a mode where the authorization management server performs a decryption process and the image forming apparatus performs a rasterization process; and comparing the first processing time and the second processing time, and, in accordance with a result of the comparison, determining which one of the image forming apparatus and the authorization management server is to perform a decryption process; the authorization management server transmitting a decryption key for decrypting the encrypted file when receiving an authorization check request from the image forming apparatus, and decrypting the encrypted file and transmitting the decrypted print file to the image forming apparatus when receiving the encrypted file from the image forming apparatus; and the image forming apparatus performing a rasterization process on the print file decrypted by one of the image forming apparatus and the authorization management server.

To achieve the abovementioned object, according to an aspect, there is provided a non-transitory recording medium storing a computer readable encrypted file print control program to be executed in an image forming apparatus in a system in which a client terminal that generates a print file, an authorization management server that manages authorization of the print file, and the image forming apparatus that performs printing of the print file are connected by a communication network, and the encrypted file print control program reflecting one aspect of the present invention causes a control unit of the image forming apparatus to perform: a first process to receive, from the client terminal, an encrypted file generated by encrypting the print file with an encryption key generated by the authorization management server, and receive file information added as metadata to the encrypted file, the file information indicating a structure of the print file; a second process to read the file information added to the encrypted file and calculate a rasterization complexity in the image forming apparatus in accordance with the file information before the encrypted file is decrypted; a third process to calculate a first processing time in a first processing mode and a second processing time in a second processing mode in accordance with CPU performance information about the image forming apparatus and the authorization management server, information about an allocation of a memory to a rasterization process, the file information, and the rasterization complexity, the first processing mode being a mode where the image forming apparatus performs a decryption process and a rasterization process in parallel, the second processing mode being a mode where the authorization management server performs a decryption process and the image forming apparatus performs a rasterization process; and a fourth process to compare the first processing time and the second processing time, and, in accordance with a result of the comparison, determine which one of the image forming apparatus and the authorization management server is to perform a decryption process.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5A is a block diagram showing the configuration of an image forming apparatus according to an embodiment of the present invention;

FIG. 5B is a block diagram showing the configuration of an image forming apparatus according to an embodiment of the present invention;

FIG. 9A is a diagram for explaining memory allocations in an image forming apparatus according to an embodiment of the present invention;

FIG. 9B is a diagram for explaining memory allocations in an image forming apparatus according to an embodiment of the present invention;

FIG. 9C is a diagram for explaining memory allocations in an image forming apparatus according to an embodiment of the present invention;

FIG. 9D is a diagram for explaining memory allocations in an image forming apparatus according to an embodiment of the present invention;

FIG. 10 is an example of a table (management information) to be used in encrypted file print control according to an embodiment of the present invention;

FIG. 11 is an example of a table (file information) to be used in encrypted file print control according to an embodiment of the present invention;

FIG. 12 is an example of a table (file complexity information in each apparatus) to be used in encrypted file print control according to an embodiment of the present invention;

FIG. 14 is a diagram for explaining, through comparisons, the processing time in a case where a decryption process and a rasterization process are performed in an image forming apparatus according to an embodiment of the present invention, and the processing time in a case where a decryption process is performed in an authorization management server and a rasterization process is performed in the image forming apparatus;

FIG. 15A is a graph for explaining, through comparison, the processing time in a case where a decryption process and a rasterization process are performed in an image forming apparatus according to an embodiment of the present invention, and the processing time in a case where a decryption process is performed in an authorization management server and a rasterization process is performed in the image forming apparatus;

FIG. 15B is a graph for explaining, through comparison, the processing time in a case where a decryption process and a rasterization process are performed in an image forming apparatus according to an embodiment of the present invention, and the processing time in a case where a decryption process is performed in an authorization management server and a rasterization process is performed in the image forming apparatus; and FIG. 15C is a graph for explaining, through comparison, the processing time in a case where a decryption process and a rasterization process are performed in an image forming apparatus according to an embodiment of the present invention, and the processing time in a case where a decryption process is performed in an authorization management server and a rasterization process is performed in the image forming apparatus.

DESCRIPTION OF THE PREFERRED EMBODIMENTS

Hereinafter, an embodiment of the present invention will be described with reference to the drawings. However, the scope of the invention is not limited to the illustrated examples.

As described above as the related art, in a case where a file protected with a technology such as RMS is transmitted directly to MFP or a printer, and direct printing is performed, the file needs to be decrypted before rasterized. However, the decryption process puts a large load on the CPU, and therefore, the printing performance degrades in a case where decryption and rasterization are performed in parallel. Furthermore, since the file structure of an encrypted file is not clear unless the encrypted file is decrypted, the times to be required for a decryption process and a rasterization process cannot be calculated, and therefore, it is difficult to predict a required print time.

In view of the above, according to an embodiment of the present invention, file information (such as the file size, the number of pages, and the file/object type) is added as metadata to an encrypted file generated from a print file.

When the encrypted file is to be printed, the file information is read before the encrypted file is decrypted, and the rasterization complexity in the image forming apparatus that performs the printing process is calculated in accordance with the file information (the file/object type). The processing time required in a case where the image forming apparatus performs a decryption process and a rasterization process on the encrypted file in parallel, and the processing time required in a case where the authorization management server performs a decryption process on the encrypted file and the image forming apparatus performs a rasterization process on the encrypted file are calculated in accordance with the CPU performance information about the image forming apparatus and the authorization management server, information about the memory allocation to a rasterization process, the file information (the file size and the number of pages), and the rasterization complexity. A decryption destination is then determined in accordance with a result of comparison between the processing times. In this manner, printing performance is improved, and the required print time is shortened.

[Embodiment]

Figure 1:
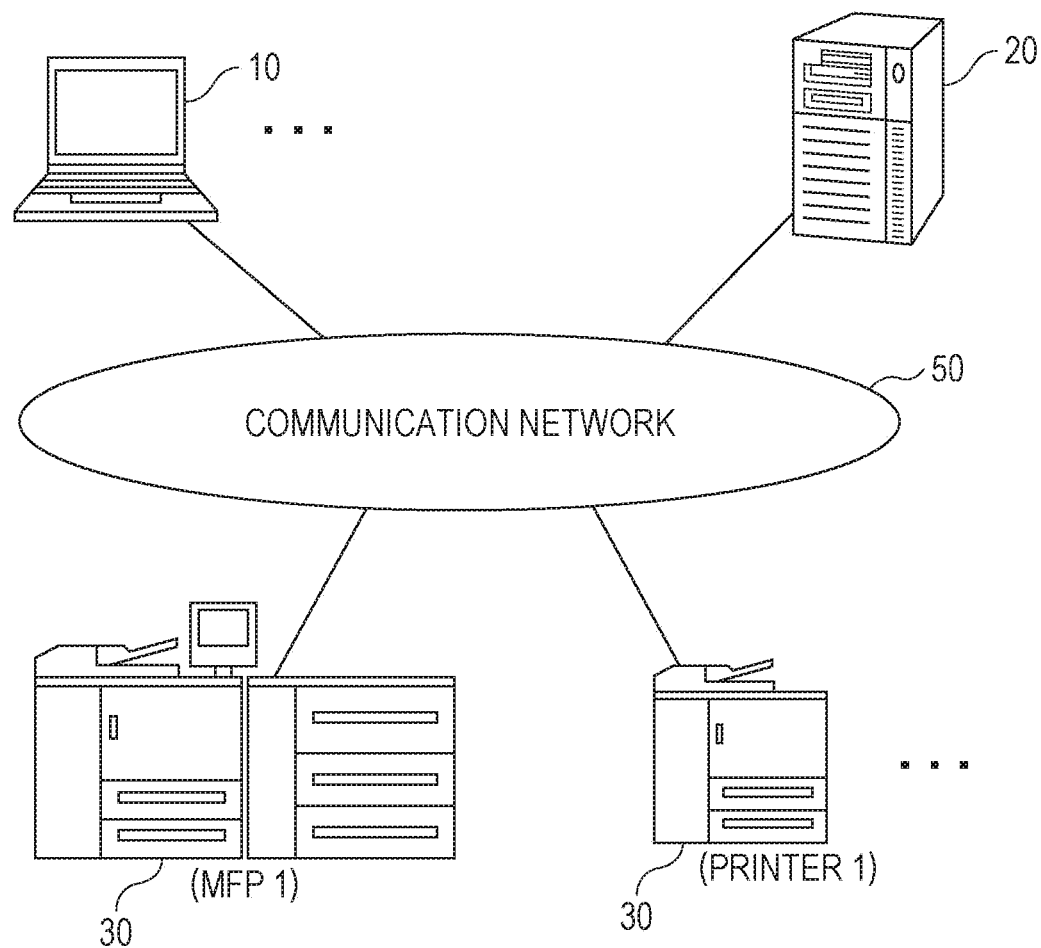
FIG. 1 is a schematic diagram showing an example configuration of an encrypted file printing system according to an embodiment of the present invention.
Figure 2:
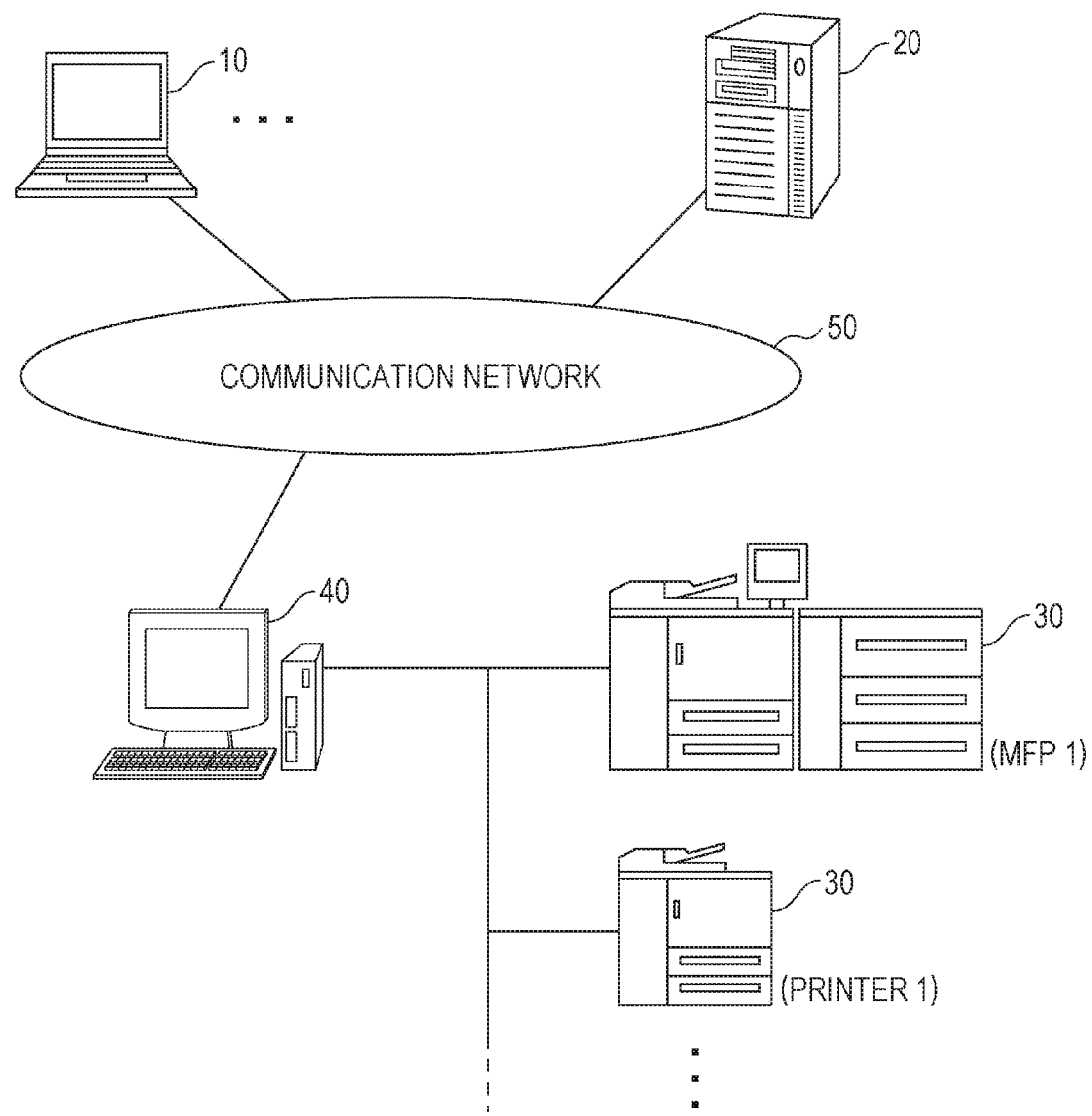
FIG. 2 is a schematic diagram showing another example configuration of an encrypted file printing system according to an embodiment of the present invention.
Figure 6:
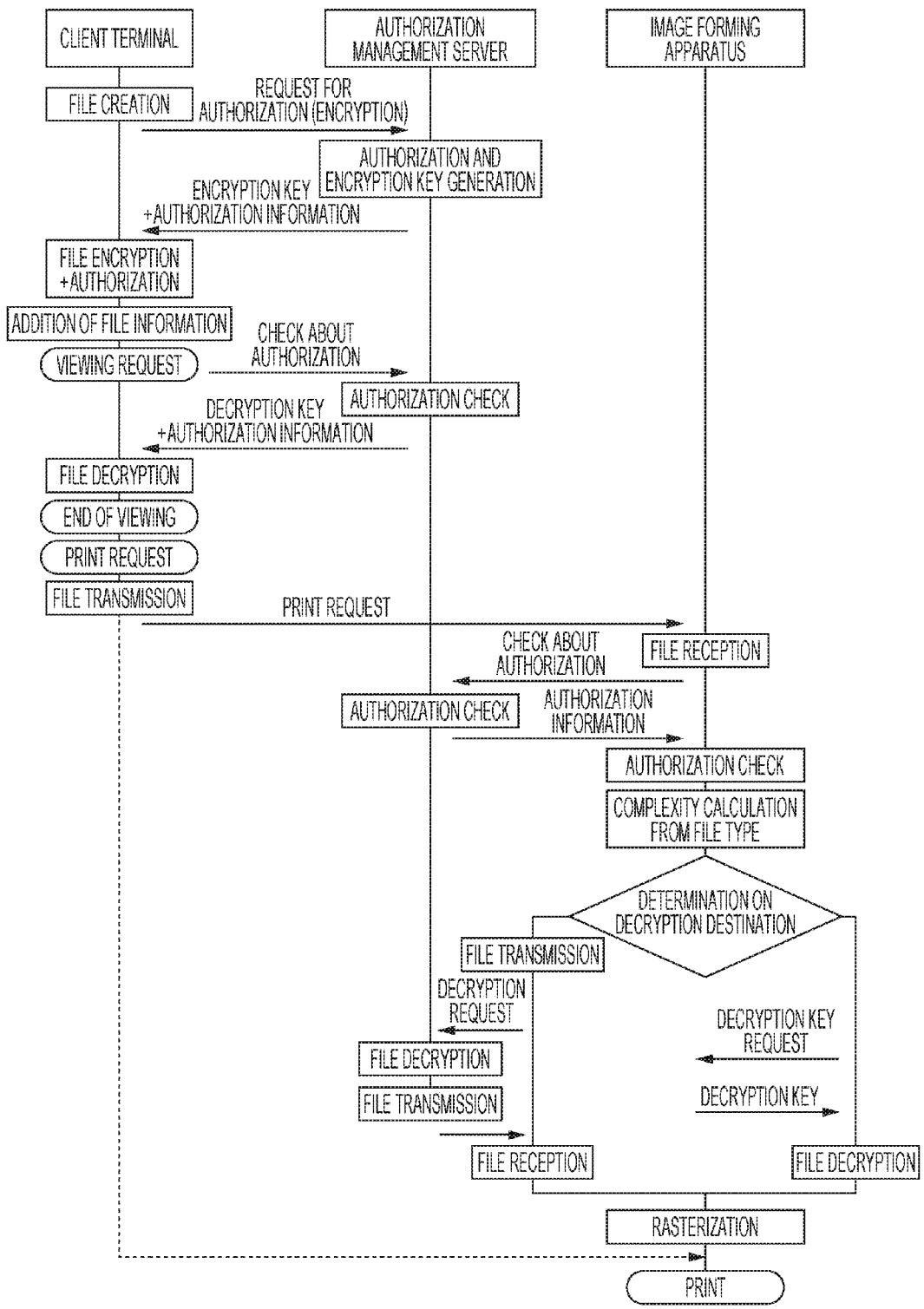
FIG. 6 is a sequence chart showing the entire operation of an encrypted file printing system according to an embodiment of the present invention.
Figure 7:
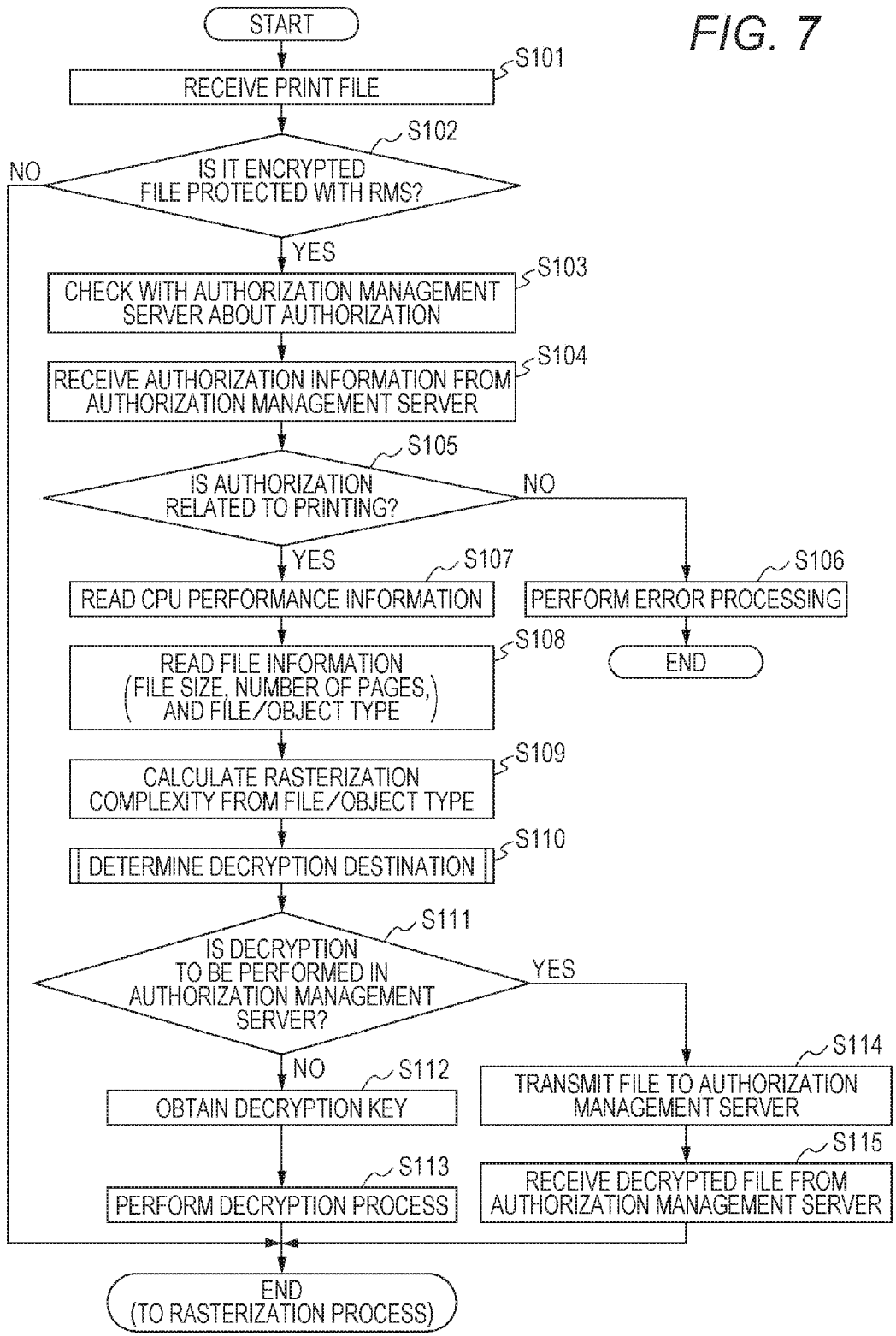
FIG. 7 is a flowchart showing an operation of an image forming apparatus according to an embodiment of the present invention.
Figure 8:
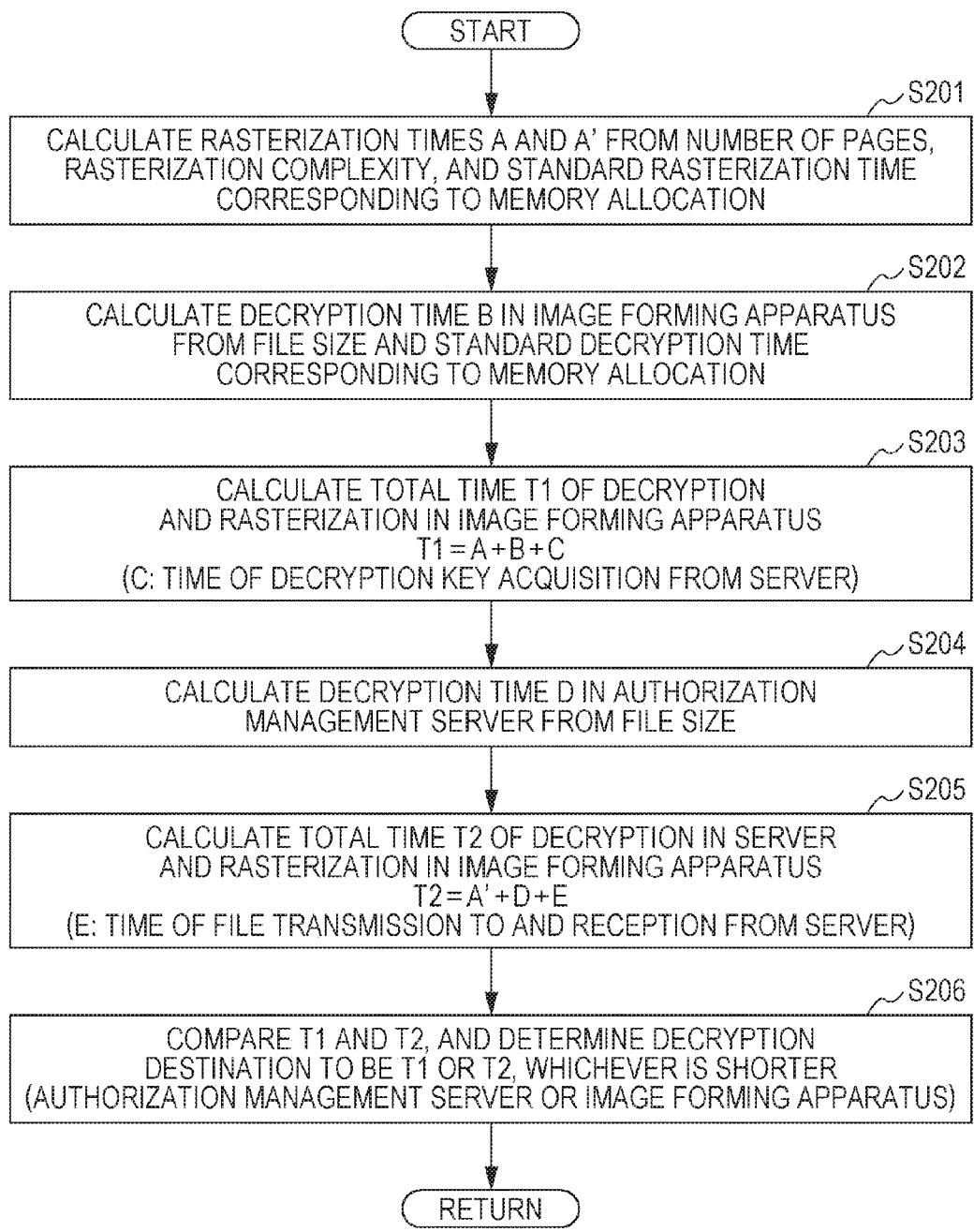
FIG. 8 is a flowchart showing an operation (a decryption destination determination process) of an image forming apparatus according to an embodiment of the present invention.

To explain the above-described embodiment of the present invention in greater detail, an encrypted file printing system, an encrypted file printing method, and an encrypted file print control program according to an embodiment of the present invention are described, with reference to FIGS. 1 through 15C. FIGS. 1 and 2 are schematic diagrams showing example configurations of encrypted file printing systems of this embodiment. FIGS. 3A and 3B, FIGS. 4A and 4B, and FIGS. 5A and 5B are block diagrams showing configurations of a client terminal, an authorization management server, and an image forming apparatus, respectively. FIG. 6 is a sequence chart showing the entire operation of an encrypted file printing system of this embodiment. FIGS. 7 and 8 are flowcharts showing operations of the image forming apparatus. FIGS. 9A through 9D are diagrams for explaining memory allocations in decryption processes and rasterization processes. FIGS. 10 through 12 are examples of tables to be used in controlling encrypted file printing. FIGS. 13A through 15C are graphs for explaining, through comparisons, the processing time in a case where a decryption process and a rasterization process are performed in the image forming apparatus, and the processing time in a case where a decryption process is performed in the authorization management server and a rasterization process is performed in the image forming apparatus.

As shown in FIG. 1, an encrypted file printing system of this embodiment includes one or more client terminals 10 that create or view a file, an authorization management server 20 that performs authorization management on a file, and one or more image forming apparatuses 30 (MFP 1 and a printer 1 in this example) that perform printing in accordance with a file. These apparatuses are connected by a communication network 50, such as Ethernet (a registered trade name), a token ring, or a Local Area Network (LAN) or a Wide Area Network (WAN) specified in standards such as Fiber-Distributed Data Interface (FDDI). Although the encrypted file printing system is formed with the client terminals 10, the authorization management server 20, and the image forming apparatuses 30 in FIG. 1, an image processing device 40, such as a raster image processor (RIP) controller, may be connected to the communication network 50, and the image processing device 40 may perform a rasterization process. In the description below, respective apparatuses are explained in detail on the basis of the system shown in FIG. 1.

[Client Terminal]

Figure 3A:
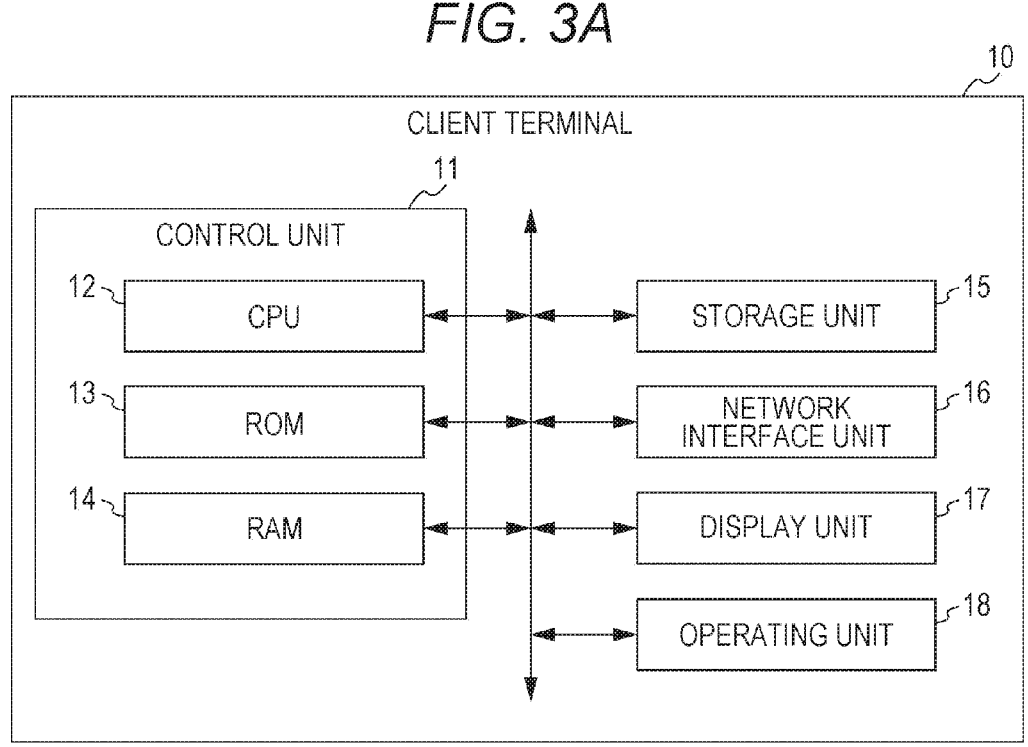
FIG. 3A is a block diagram showing the configuration of a client terminal according to an embodiment of the present invention.

A client terminal 10 is a computing apparatus such as a personal computer, and includes a control unit 11, a storage unit 15, a network interface unit 16, a display unit 17, and an operating unit 18, as shown in FIG. 3A.

Figure 3B:
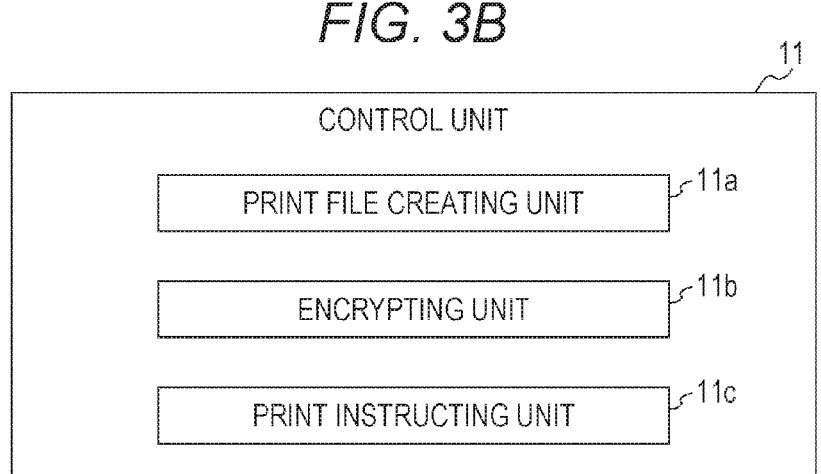
FIG. 3B is a block diagram showing the configuration of a client terminal according to an embodiment of the present invention.

The control unit 11 includes a CPU 12 and memories such as a read only memory (ROM) 13 and a random access memory (RAM) 14. The CPU 12 controls the entire operation of the client terminal 10 by loading a control program stored in the ROM 13 or the storage unit 15 into the RAM 14, and executing the control program. As shown in FIG. 3B, the control unit 11 functions as a print file creating unit 11a, an encrypting unit 11b, a print instructing unit 11c, and the like.

The print file creating unit 11a is an application, such as Office of Microsoft or Adobe Reader of Adobe Systems, and creates or views a file to be printed (such a file will be hereinafter referred to as a print file).

The encrypting unit 11b requests the authorization management server 20 to authorize a print file. Using an encryption key obtained from the authorization management server 20, the encrypting unit 11b encrypts the print file (the encrypted print file is called an encrypted file), and authorize the encrypted file. In doing so, the encrypting unit 11b adds file information (such as the file size, the number of pages, the file type, and the object type) about the print file as metadata, to the encrypted file. In a case where an encrypted file is to be used (printed, viewed, edited, or saved, for example), the encrypting unit 11b checks with the authorization management server 20 about authorization. Using a decryption key obtained from the authorization management server 20, the encrypting unit 11b decrypts the encrypted file, and enables the use of the print file.

The print instructing unit 11c transmits an authorized encrypted file directly to an image forming apparatus 30 (the MFP 1 or the printer 1), and instructs the image forming apparatus 30 to print the print file.

The storage unit 15 is formed with a hard disk drive (HDD) or a solid state drive (SSD), and stores the program for the CPU 12 to control the respective components, the information about the processing functions of its own apparatus, print files, encrypted files, and the like.

The network interface unit 16 is formed with a network interface card (NIC) or a modem, and connects the client terminal 10 to the communication network 50, to enable the client terminal 10 to communicate with the authorization management server 20 and the image forming apparatuses 30.

The display unit 17 is formed with a liquid crystal display (LCD) or an organic electroluminescence (EL) display device, and displays a print file creating screen, a print instructing screen, or the like.

The operating unit 18 is formed with a mouse, a keyboard, and the like, and enables operations such as creation of a print file, encryption of a print file, decryption of an encrypted file, and an instruction to print an encrypted file.

[Authorization Management Server]

Figure 4A:
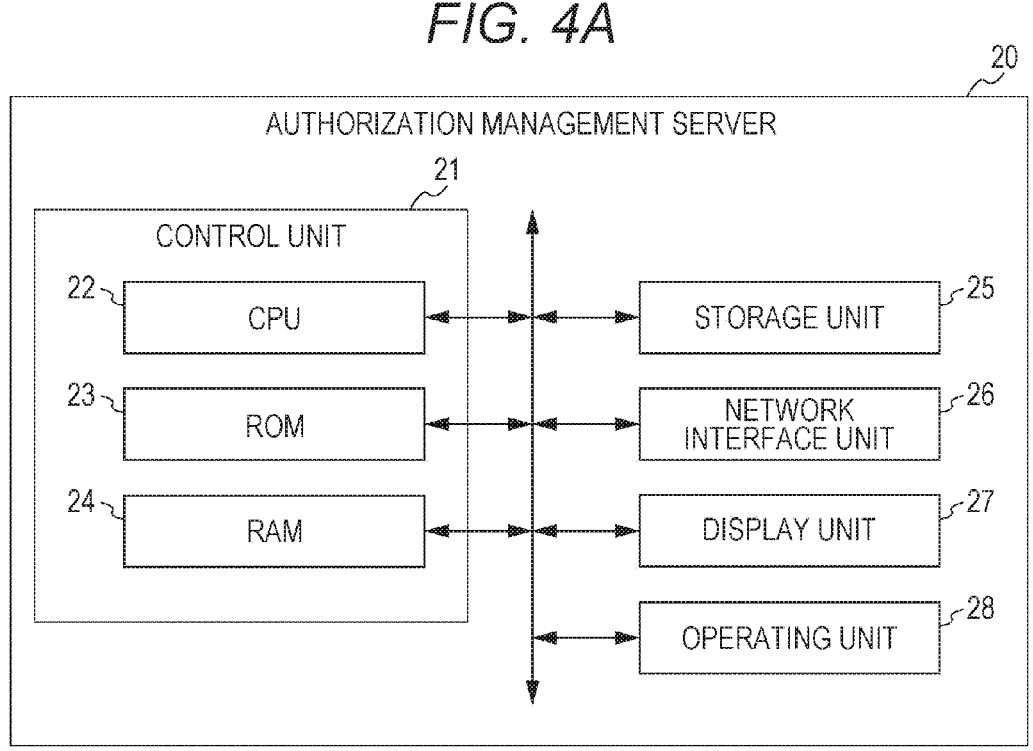
FIG. 4A is a block diagram showing the configuration of an authorization management server according to an embodiment of the present invention.

The authorization management server 20 is a computing apparatus or the like, and manages authorization and encryption/decryption of print files. As shown in FIG. 4A, the authorization management server 20 includes a control unit 21, a storage unit 25, and a network interface unit 26, and, if necessary, further includes a display unit 27 and an operating unit 28.

Figure 4B:
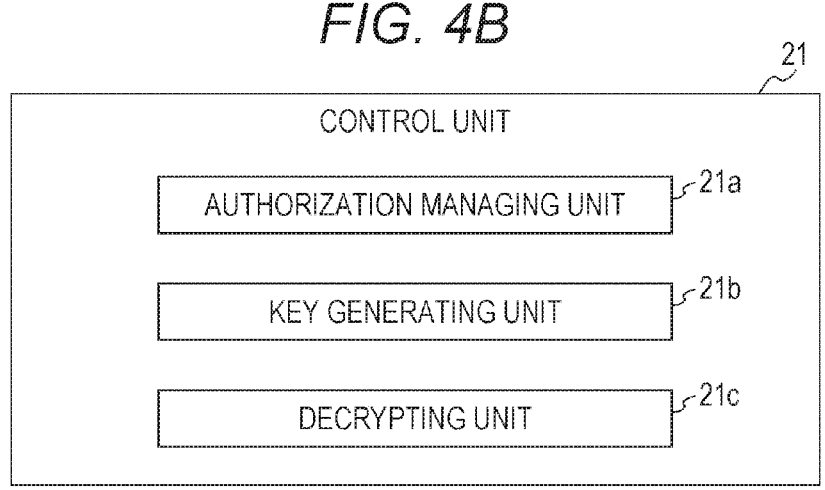
FIG. 4B is a block diagram showing the configuration of an authorization management server according to an embodiment of the present invention.

The control unit 21 includes a CPU 22 and memories such as a ROM 23 and a RAM 24. The CPU 22 controls the entire operation of the authorization management server 20 by loading a control program stored in the ROM 23 or the storage unit 25 into the RAM 24, and executing the control program. As shown in FIG. 4B, the control unit 21 functions as an authorization managing unit 21a, a key generating unit 21b, a decrypting unit 21c, and the like.

In accordance with an instruction from a client terminal 10, the authorization managing unit 21a authorizes a print file to be viewed, edited, saved, or printed, for example.

In accordance with an authorization request from a client terminal 10, the key generating unit 21b authorizes a print file, generates an encryption key for encrypting the print file, and transmits the encryption key and authorization information to the client terminal 10. The key generating unit 21b also generates a decryption key in response to an authorization check request from a client terminal 10 or an image forming apparatus 30, and transmits the decryption key and authorization information to the client terminal 10 or the image forming apparatus 30.

In response to a decryption request from an image forming apparatus 30, the decrypting unit 21c decrypts an encrypted file, and transmits the decrypted print file to the image forming apparatus 30.

The storage unit 25 is formed with an HDD or an SSD, and stores the program for the CPU 22 to control the respective components, print files received from the client terminals 10, encrypted files received from the image forming apparatuses 30, the information for the authorization managing unit 21a to manage authorization, encryption keys and decryption keys generated by the key generating unit 21b, and the like.

The network interface unit 26 is formed with an NIC or a modem, and connects the authorization management server 20 to the communication network 50, to enable the authorization management server 20 to communicate with the client terminals 10 and the image forming apparatuses 30.

[Image Forming Apparatus]

An image forming apparatus 30 is an MFP, a printer, or the like, and performs printing in accordance with an encrypted file received from a client terminal 10. As shown in FIG. 5A, the image forming apparatus 30 includes a control unit 31, a storage unit 35, a network interface unit 36, a display operating unit 37, an image processing unit 38, and a printing unit 39.

The control unit 31 includes a CPU 32 and memories such as a ROM 33 and a RAM 34. The CPU 32 controls the entire operation of the image forming apparatus 30 by loading a control program stored in the ROM 33 or the storage unit 35 into the RAM 34, and executing the control program. As shown in FIG. 5B, the control unit 31 functions as a complexity calculating unit 31a, a processing time calculating unit 31b, a decryption destination determining unit 31c, and the like.

The complexity calculating unit 31a reads file information added as metadata to an encrypted file, and identifies the file size, the number of pages, the file type, the object type, and the like of the original print file. In accordance with the file information, the complexity calculating unit 31a calculates the rasterization complexity indicating the degree of difficulty in rasterizing in the image forming apparatus 30.

The processing time calculating unit 31b obtains CPU performance information from the authorization management server 20, and calculates the standard decryption time in the authorization management server 20 in accordance with the CPU performance information. Furthermore, in accordance with the CPU performance information about the image forming apparatus 30, the processing time calculating unit 31b calculates the standard decryption times and the standard rasterization times in a case where the memory allocation to the rasterization process is large and in a case where the memory allocation to the rasterization process is small. Further, in accordance with the page information, the rasterization complexity, and the standard rasterization time depending on the memory allocation, the processing time calculating unit 31b calculates the time required for a rasterization process in a case where the image forming apparatus 30 performs a decryption process and a rasterization process in parallel (this required time will be hereinafter referred to as the first rasterization time), and the time required for a rasterization process in a case where the image forming apparatus 30 performs only a rasterization process (this required time will be hereinafter referred to as the second rasterization time). Furthermore, in accordance with the file size and the standard decryption time, the processing time calculating unit 31b calculates the time required for an encrypted file decryption process in the image forming apparatus 30 (the decrypting unit in the image processing unit 38) (this required time will be hereinafter referred to as the first decryption time), and the time required for an encrypted file decryption process in the authorization management server 20 (this required time will be hereinafter referred to as the second decryption time). The processing time calculating unit 31b further calculates a first processing time by combining the first decryption time, the first rasterization time, and the communication time required for obtaining a decryption key from the authorization management server 20, and a second processing time by combining the second decryption time, the second rasterization time, and the communication time required for transmitting an encrypted file to the authorization management server 20 and receiving a decrypted print file.

The decryption destination determining unit 31c compares the first processing time (the processing time in a case where the image forming apparatus 30 performs a decryption process and a rasterization process in parallel) with the second processing time (the processing time in a case where the authorization management server 20 performs a decryption process and the image forming apparatus 30 performs a rasterization process), and, in accordance with a result of the comparison, determines a decryption destination (the authorization management server 20 or the image forming apparatus 30).

The complexity calculating unit 31a, the processing time calculating unit 31b, and the decryption destination determining unit 31c may be formed as hardware. Alternatively, an encrypted file print control program may be designed for causing the control unit 31 to function as the complexity calculating unit 31a, the processing time calculating unit 31b, and the decryption destination determining unit 31c, and the CPU 32 may execute the encrypted file print control program.

The storage unit 35 is formed with an HDD or an SSD, and stores the program for the CPU 32 to control the respective components, the information about the processing functions of its own apparatus, the file information added to encrypted files, the CPU performance information, the decryption times (the standard decryption time, the first decryption time, and the second decryption time), the rasterization times (the standard rasterization time, the first rasterization time, and the second rasterization time), the rasterization complexity, the first processing time, the second processing time, and the like.

The network interface unit 36 is formed with an NIC or a modem, and connects the image forming apparatus 30 to the communication network 50, to enable the image forming apparatus 30 to communicate with the client terminals 10 and the authorization management server 20.

The display operating unit 37 is a touch panel or the like that has a pressure-sensitive operating unit (a touch sensor) including transparent electrodes arranged in a lattice on a display unit, and displays various screens related to image forming processes, to enable various operations related to image forming processes (such as checks with the authorization management server 20 about authorization, requests for a decryption key, and decryption requests).

The image processing unit 38 functions as a decrypting unit. In a case where a file received from a client terminal 10 is an encrypted file, the image processing unit 38 decrypts the encrypted file, using a decryption key obtained from the authorization management server 20. The image processing unit 38 also functions as a raster image processor (RIP) unit, and generates bitmap image data by performing a rasterization process on an unencrypted print file or a decrypted print file. The image processing unit 38 also performs screen processing, tone correction, density balance adjustment, thinning, halftone dot processing, and the like on the bitmap image data, as necessary. The image processing unit 38 then outputs the generated bitmap image data to the printing unit 39. It should be noted that the image processing unit 38 performs the decryption process and the rasterization process, using a specific region in the memory in the control unit 31 or a special-purpose memory.

In accordance with the bitmap image data, the printing unit 39 performs a printing process. The printing unit 39 includes: an image forming unit that includes exposing units that perform exposure by emitting laser light in accordance with the bitmap image data, photosensitive drums, charging units, photosensitive member cleaning units, and primary transfer rollers, and forms toner images in the respective colors of CMYK; an intermediate belt that is rotated by rollers and functions as an intermediate transfer member that conveys the toner images formed by the image forming unit onto a paper sheet; a secondary transfer roller that transfers the toner images formed on the intermediate belt onto the paper sheet; a fixing unit that fixes the toner images transferred onto the paper sheet; and a conveying unit including sheet feed rollers for conveying the paper sheet, resist rollers, loop rollers, reverse rollers, and sheet ejecting rollers.

FIGS. 1 through 5B show examples of encrypted file printing systems of this embodiment, and modifications may be made to the configurations of the respective apparatuses and the control operations on the respective apparatuses, as long as the encrypted file print control of this embodiment can be performed.

For example, in FIG. 1, the control unit 31 of an image forming apparatus 30 functions as the complexity calculating unit 31*a*, the processing time calculating unit 31*b*, and the decryption destination determining unit 31*c* (the CPU 32 executes an encrypted file print control program). In the case where the image processing device 40 includes a decrypting unit and an RIP unit, however, the control unit of the image processing device 40 may function as the complexity calculating unit 31*a*, the processing time calculating unit 31*b*, and the decryption destination determining unit 31*c* (the CPU of the image processing device 40 executes an encrypted file print control program).

Furthermore, in the above-described configuration, the image processing unit 38 has the functions of a decrypting unit. However, the control unit 31 may function as a decrypting unit. In that case, the decrypting unit performs a decryption process, using the same memory as that used by the RIP unit of the image processing unit 38.

Furthermore, in the above-described configuration, a client terminal 10 obtains an encryption key from the authorization management server 20, and then performs an encryption process. However, the authorization management server 20 may perform an encryption process, add file information as metadata to the encrypted file, and transmit the encrypted file to a client terminal 10.

Referring now to the sequence chart in FIG. 6, the entire operation of an encrypted file printing system of this embodiment is described.

A client terminal 10 creates and views a print file. In a case where the client terminal 10 is to authorize and encrypt a PDF file, for example, the client terminal 10 requests authorization and encryption from the authorization management server 20. The authorization management server 20 authorizes the PDF file, and generates an encryption key for encrypting the PDF file. The authorization management server 20 then transmits the encryption key and authorization information to the client terminal 10. Receiving the encryption key and the authorization information from the authorization management server 20, the client terminal 10 encrypts the PDF file, and authorizes the encrypted PDF file. In this embodiment, in encrypting the PDF file, the client terminal 10 further adds file information as metadata to the PDF file. This file information does not affect viewing of the PDF file at the client terminal 10, but is used at the time of the later described direct printing of the PDF file.

In a case where the encrypted PDF file is to be viewed with an application in the client terminal 10, a check is made with the authorization management server 20 about authorization. The authorization management server 20 in turn checks authorization of the encrypted PDF file, and transmits a decryption key and authorization information to the client terminal 10. In accordance with the authorization information, the client terminal 10 determines whether the encrypted PDF file is authorized. If the encrypted PDF file is authorized, the client terminal 10 decrypts the PDF file, using the decryption key. As a result, the authorized content of the PDF file can be viewed.

In a case where the encrypted PDF file is to be printed, the PDF file is transmitted directly to an image forming apparatus 30. Receiving the encrypted PDF file, the image forming apparatus 30 checks with the authorization management server 20 about authorization. The authorization management server 20 in turn checks authorization of the encrypted PDF file, and transmits authorization information to the image forming apparatus 30. The image forming apparatus 30 also reads the file information in the metadata, and calculates the rasterization complexity in accordance with the file/object type. In accordance with information such as the calculated rasterization complexity, the file size, the number of pages, the CPU performance information about the image forming apparatus 30 and the authorization management server 20, the standard decryption time of the authorization management server 20, the standard decryption time and the standard rasterization time depending on the memory allocation in the image forming apparatus 30, the image forming apparatus 30 determines which process is faster, decrypting and rasterizing the PDF file in the image forming apparatus 30, or decrypting the PDF file in the authorization management server 20 and only rasterizing the PDF file in the image forming apparatus 30.

In a case where the image forming apparatus 30 determines that it is faster to cause the authorization management server 20 to decrypt the PDF file, the image forming apparatus 30 transmits the encrypted PDF file to the authorization management server 20. The authorization management server 20 decrypts the PDF file, and transmits the decrypted PDF file to the image forming apparatus 30. The image forming apparatus 30 receives the decrypted PDF file, and then rasterizes the PDF file. In a case where the image forming apparatus 30 determines that it is faster to decrypt the PDF file in the image forming apparatus 30, on the other hand, the image forming apparatus 30 requests a decryption key from the authorization management server 20. After receiving the decryption key from the authorization management server 20, the image forming apparatus 30 decrypts the PDF file, and rasterizes the decrypted PDF file.

In many cases, encryption is performed collectively on files. In some cases, however, encryption is performed page by page or chapter by chapter, so that decryption and rasterization can be performed in parallel to increase the printing speed. In this embodiment, encryption is supposedly performed page by page or chapter by chapter, and attention is paid to the amount of memory use in a case where decryption and rasterization are performed in parallel. A rasterization time is calculated in accordance with the memory allocation, and a check is made to determine which process is faster, decrypting and rasterizing a PDF file in an image forming apparatus 30, or decrypting the PDF file in the authorization management server 20 and only rasterizing the PDF file in an image forming apparatus 30.

Next, operations of an image forming apparatus 30 of this embodiment are described. The CPU 32 loads an encrypted file print control program from the ROM 33 or the storage unit 35 into the RAM 34, and executes the encrypted file print control program, to carry out the processes in the respective steps shown in the flowcharts in FIGS. 7 and 8. In a case where the encrypted file printing system includes the image processing device 40, and a rasterization process is performed with the RIP unit of the image processing device 40, the CPU of the image processing device 40 should execute the encrypted file print control program.

As shown in FIG. 7, receiving a print file from a client terminal 10 (S101), the control unit 31 determines whether the print file is an encrypted file (an encrypted file protected by RMS, for example) (S102). It should be noted that the check can be made to determine whether the print file is an encrypted file, from the extension of the file.

If the print file is not an encrypted file (No in S102), the image processing unit 38 (RIP unit) performs a rasterization process on the print file. In accordance with the bitmap image data obtained as a result of the rasterization process, the printing unit 39 performs a printing process. If the print file is an encrypted file (Yes in S102), on the other hand, the control unit 31 checks with the authorization management server 20 about authorization (S103), and receives authorization information from the authorization management server 20 (S104).

The control unit 31 then determines whether printing is authorized in accordance with the received authorization information (S105). If printing is not authorized (but viewing, editing, saving, or the like is authorized), the control unit 31 performs error processing, such as displaying a message on the display operating unit 37 to the effect that printing cannot be performed (S106), and ends the series of processes.

If printing is authorized, the control unit 31 (the complexity calculating unit 31a) reads the CPU performance information from the storage unit 35 (S107), and reads the file size, the number of pages, the file/object type, and the like from the file information added as metadata to the encrypted file (S108). The control unit 31 (the complexity calculating unit 31a) then calculates the rasterization complexity in accordance with the file/object type (S109), and the control unit 31 (the decryption destination determining unit 31c) determines the decryption destination in accordance with the above pieces of information (S110). This step will be described later in detail.

If the authorization management server 20 does not perform decryption (the image forming apparatus 30 performs decryption) in accordance with a result of the determination (No in S111), the image processing unit 38 (the decrypting unit) obtains a decryption key from the authorization management server 20 (S112), and performs a decryption process on the encrypted file, using the decryption key (S113). After that, the image processing unit 38 (RIP unit) performs a rasterization process on the decrypted print file, and the printing unit 39 performs a printing process.

If the authorization management server 20 performs decryption (Yes in S111), on the other hand, the control unit 31 transmits the encrypted file to the authorization management server 20 (S114), and receives the decrypted print file from the authorization management server 20 (S115). After that, the image processing unit 38 (RIP unit) performs a rasterization process on the decrypted print file, and the printing unit 39 performs a printing process.

Referring now to FIG. 8, the decryption destination determination process in step S110 is described.

First, according to the equations (shown below) based on the number of pages, the rasterization complexity, and the standard rasterization time depending on the memory allocation, the control unit 31 (the processing time calculating unit 31b) calculates the rasterization time A (the above-described first rasterization time) in the image forming apparatus 30 (the RIP unit in the image processing unit 38) in a case where the image forming apparatus 30 performs a decryption process and a rasterization process in parallel, and the rasterization time A' (the above-described second rasterization time) in the image forming apparatus 30 (the RIP unit in the image processing unit 38) in a case where the image forming apparatus 30 performs only a rasterization process (S201).

$A$=the number of pages based on the file/object type×the rasterization complexity×the standard rasterization time in a case where the memory allocation to the rasterization process is small (parallel processing)

$A'$=the number of pages based on the file/object type×the rasterization complexity×the standard rasterization time in a case where the memory allocation to the rasterization process is large The file/object type is "only text", "only graphics, or text+graphics", "including image objects", "VDP without image objects", VDP with image objects", or the like.

According to the equation (shown below) based on the file size and the standard decryption time depending on the memory allocation, the control unit 31 (the processing time calculating unit 31b) next calculates the decryption time B (the above-described first decryption time) in the image forming apparatus 30 (the decrypting unit in the image processing unit 38) (S202). It should be noted that the standard decryption time in the image forming apparatus 30 can be calculated in accordance with the CPU performance information shown in FIG. 10. Furthermore, as will be described later, the standard decryption time in the image forming apparatus 30 varies with the storage area of the memory allocated to the decryption process, and therefore, the standard decryption time is the time in the case where the memory allocation is small (parallel processing).

$B$=the file size×the standard decryption time in the image forming apparatus 30 in a case where the memory allocation to a decryption process is small (parallel processing).

The control unit 31 (the processing time calculating unit 31b) then calculates the processing time T1 (the above-described first processing time) in the image forming apparatus 30 by combining the rasterization time A in the image forming apparatus 30 (the RIP unit in the image processing unit 38), the decryption time B in the image forming apparatus 30 (the decrypting unit in the image processing unit 38), and a precalculated time C of the decryption key acquisition from the authorization management server 20 (S203).

$T1 = A + B + C$

The control unit 31 (the processing time calculating unit 31b) then calculates the decryption time D (the above-described second decryption time) in the authorization management server 20 from the file size, according to the equation shown below (S204). It should be noted that the standard decryption time in the authorization management server 20 can be calculated in accordance with the CPU performance information shown in FIG. 10.

$D$=the file size×the standard decryption time in the authorization management server The control unit 31 (the processing time calculating unit 31b) then calculates the processing time T2 (the above-described second processing time) in the authorization management server 20 and the image forming apparatus 30 by combining the rasterization time A' in the image forming apparatus 30 (the RIP unit in the image processing unit 38), the decryption time D in the authorization management server 20, and a precalculated time E of transmission and reception of the file to and from the authorization management server 20 (S205).

$T2 = A' + D + E$

The control unit 31 (the decryption destination determining unit 31c) then compares the processing time T1 in the image forming apparatus 30 with the processing time T2 in the authorization management server 20 and the image forming apparatus 30, and determines the decryption destination to be the processing time T1 or T2, whichever is shorter (S206). That is, the image forming apparatus 30 is set as the decryption destination when T1 is shorter, and the authorization management server 20 is set as the decryption destination when T2 is shorter.

The determination on the decryption destination is described below in detail.

FIGS. 9A through 9D are schematic diagrams of the storage area of the memory to be used by the image processing unit 38 (a specific storage area of the memory in the control unit 31 or the storage area of the memory only for the image processing unit 38). As shown in FIG. 9A, the memory is divided into a work area with a fixed usage amount (a fixed area) and a work area with a usage amount varying with circumstances (a variable area). The fixed area is used for the overall processing (the processing other than rasterization and decryption) in the image processing unit 38, and the variable area is used for rasterization and decryption.

In a case where the image forming apparatus 30 does not perform the decryption process (or where the authorization management server 20 performs the decryption process), all the variable area can be allocated to the rasterization as shown in FIG. 9B, and accordingly, the rasterization time can be shortened. In a case where the image forming apparatus 30 performs the decryption process, on the other hand, part of the variable area is allocated to the decryption process, as shown in FIG. 9C. As a result, the storage area allocated to the rasterization process becomes smaller, and the rasterization time becomes relatively long. As the rasterization time varies between a case where the authorization management server 20 performs the decryption process and a case where the image forming apparatus 30 performs the decryption process (or performs the decryption and the rasterization in parallel), rasterization times (A and A') corresponding to memory allocations are calculated in this embodiment.

In a case where the image forming apparatus 30 performs the decryption process, if the structure of the print file is not complicated, the storage area allocated to the rasterization process can be reduced, as shown in FIG. 9D. As a result, a larger part of the variable area can be used for the decryption process, and the decryption time can be shortened. If the structure of the print file is complicated, on the other hand, most of the variable area is used for the rasterization process so as to improve performance using a cache, as shown in FIG. 9C. As a result, the storage area allocated to the decryption process is reduced, and the decryption time becomes relatively long. As described above, in a case where the image forming apparatus 30 performs the decryption process, the decryption time also varies between a complicated file structure and an uncomplicated file structure. In view of this, decryption times corresponding to memory allocations are calculated in this embodiment.

FIG. 10 shows the management information being managed by an image forming apparatus 30. In this management information, the CPU performance of the authorization management server 20 and the CPU performance of the image forming apparatus 30 are written. Furthermore, the rasterization complexity calculated in S109 in FIG. 7 is written.

FIG. 11 shows the file/object types and the numbers of pages in the file information to be added as metadata to encrypted files. Although a rasterization complexity is calculated in accordance with a file/object type in this embodiment, the file/object types are indicated as file complexities represented by numerical values so as to facilitate rasterization complexity calculations. For example, it is easy to rasterize a file formed only with text, and therefore, the file complexity of the file is set at "1". The rasterization process for a complicated variable data print (VDP) file to be used in production printing takes a long time, and therefore, the file complexity of the VDP file is set at "5". The numbers of pages are the numbers corresponding to the file/object types. In the example shown in FIG. 11, the number of the pages containing only text is 10, the number of the pages containing graphics is 40, and the number of the pages containing images is 30. The rasterization times (A and A') in the image forming apparatus 30 are then calculated in accordance with the number of pages corresponding to the file/object type, the rasterization complexity set in accordance with the file/object type (or with reference to the file complexity), and the standard rasterization time corresponding to the memory allocation (the time obtained by combining the standard rasterization time calculated from the CPU performance shown in FIGS. 9A through 9D and the memory allocation shown in FIG. 8).

FIG. 12 shows the file complexities of the respective apparatuses. The performance of the RIP unit differs between the conventional printer 1 and the MFP 1 excelling in VDP file printing. Therefore, the file complexity can be changed in accordance with the characteristics of the image forming apparatus 30. For example, in the conventional printer 1, the rasterization time is longer for a lower file/object type, and therefore, the file complexity increases in descending order. In the MFP 1 excelling in VDP file printing, however, the rasterization process can be performed in a short time even for a VDP that normally has a complicated structure, and accordingly, the file complexities are set at relatively low values. As the file complexity is changed in accordance with the characteristics of the image forming apparatus 30 in this manner, the rasterization times (A and A') in the image forming apparatus 30 can be accurately calculated.

The following is a description of specific processing times in a case where an image forming apparatus 30 performs a decryption process and a rasterization process, and in a case where the authorization management server 20 performs a decryption process, and an image forming apparatus 30 performs a rasterization process.

Figure 13A:
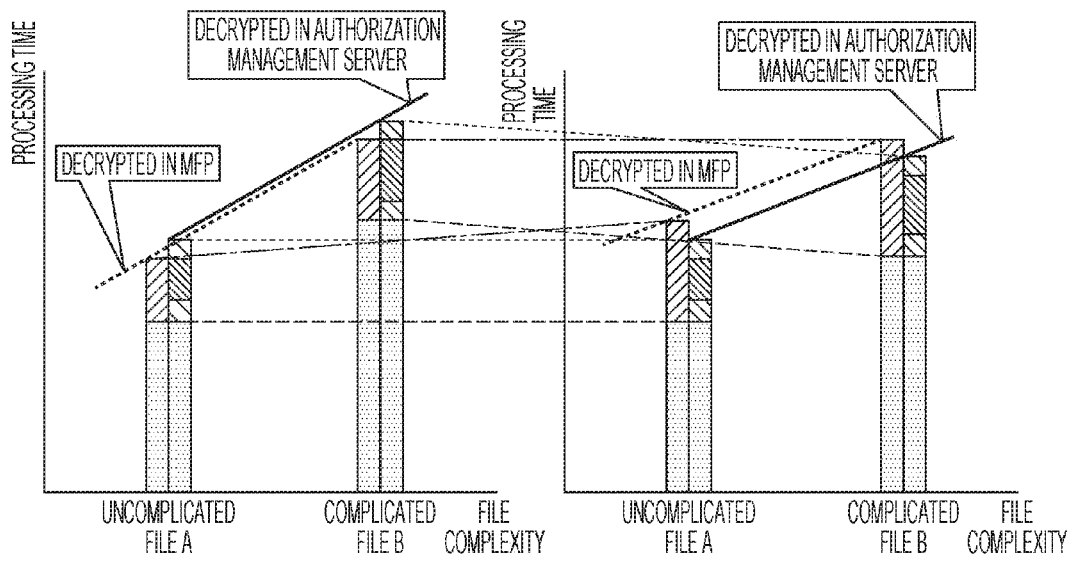
FIG. 13A is a graph for explaining, through comparison, the processing time in a case where a decryption process and a rasterization process are performed in an image forming apparatus according to an embodiment of the present invention, and the processing time in a case where a decryption process is performed in an authorization management server and a rasterization process is performed in the image forming apparatus.
Figure 13B:
FIG. 13B is a graph for explaining, through comparison, the processing time in a case where a decryption process and a rasterization process are performed in an image forming apparatus according to an embodiment of the present invention, and the processing time in a case where a decryption process is performed in an authorization management server and a rasterization process is performed in the image forming apparatus.
Figure 13C:
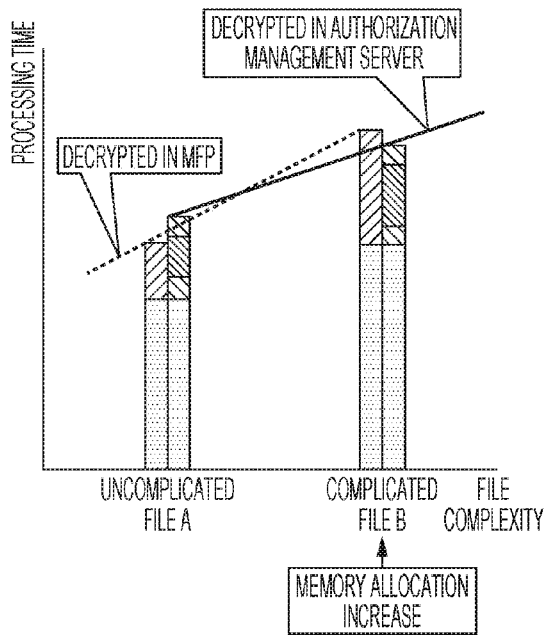
FIG. 13C is a graph for explaining, through comparison, the processing time in a case where a decryption process and a rasterization process are performed in an image forming apparatus according to an embodiment of the present invention, and the processing time in a case where a decryption process is performed in an authorization management server and a rasterization process is performed in the image forming apparatus.

FIGS. 13A through 13C are graphs showing the influence of memory allocations in a case where an image forming apparatus 30 performs a decryption process and a rasterization process, and in a case where the authorization management server 20 performs a decryption process and an image forming apparatus 30 performs a rasterization process. In each of the graphs, a pair of bars on the left side indicates processing times for an uncomplicated file A, and a pair of bars on the right side indicate processing times for a complicated file B. In each of the pairs, the bar on the left side indicates the processing time (from below, the rasterization time and the decryption time) in a case where an image forming apparatus 30 performs a decryption process and a rasterization process. In each of the pairs, the bar on the right side indicates the processing time (from below, the rasterization time, the file transmission time, the decryption time, and the file reception time) in a case where the authorization management server 20 performs a decryption process, and an image forming apparatus 30 performs a rasterization process.

FIG. 13A shows a case where the memory allocation to the rasterization process is not increased. FIG. 13B shows a case where the memory allocation to the rasterization process is increased. In the case of the uncomplicated file A, the rasterization time hardly changes even when the memory allocation to the rasterization process is increased. However, the memory allocation to the decryption process decreases by the amount equivalent to the increase in the memory allocation to the rasterization process, and the decryption time in the image forming apparatus 30 becomes longer accordingly. In the case where the authorization management server 20 performs the decryption process, on the other hand, the decryption time is not affected by the change in the memory allocation and remains the same. However, since the decryption time is short, the proportion of the file transmission and reception time becomes relatively long. As a result, in the case where the uncomplicated file A is processed, the processing time is the shortest when the image forming apparatus 30 performs decryption and rasterization in parallel without any increase in the memory allocation to the rasterization process.

In the case of the complicated file B, the rasterization time becomes shorter when the memory allocation to the rasterization process is increased. However, the memory allocation to the decryption process decreases, and the decryption time in the image forming apparatus 30 becomes longer accordingly. Therefore, the effect of the increase in the memory allocation to the rasterization process is hardly achieved. Meanwhile, as the file is complicated, the decryption time in the authorization management server 20 becomes longer. However, the proportion of the file transmission and reception time becomes relatively small, because of the long decryption time. As a result, in the case where the complicated file B is processed, the processing time is the shortest when the authorization management server 20 performs the decryption process, and the rasterization time in the image forming apparatus 30 is shortened by an increase in the memory allocation to the rasterization process.

FIG. 13C is a graph showing the pair of bars on the left side of FIG. 13A and the pair of bars on the right side of FIG. 13B. In FIG. 13C, the abscissa axis indicates the file complexity and the memory allocation to the rasterization process. The change (the thick dashed line in the graph) in the processing time in a case where the image forming apparatus 30 performs the decryption process and the rasterization process is compared with the change (the thick solid line in the graph) in the processing time in a case where the authorization management server 20 performs the decryption process and the image forming apparatus 30 performs the rasterization process. The result of the comparison shows that the two lines have different inclinations, and cross at a point. Therefore, in comparing two processing times, it is important to determine whether the file structure is complicated, and whether to increase the memory allocation to the rasterization process.

FIG. 14 is a diagram for explaining how a decryption destination is determined. When an encrypted file is received, the file complexity is first determined from the file information added as metadata to the received encrypted file. The rasterization complexity in each image forming apparatus 30 is then calculated from the file complexity. The processing time in a case where the memory allocation to the rasterization process is small, and the processing time in a case where the memory allocation to the rasterization process is large are calculated. The processing times are compared with each other, and a decryption destination is determined in accordance with a result of the comparison.

For example, in the case of a file with a low rasterization complexity, when the memory allocation to the rasterization process is reduced, the rasterization time becomes longer (the rasterization times in (1) and (2) are longer than those in (3) and (4) in FIG. 14), and the decryption time becomes shorter (the decryption time in (1) is shorter than that in (3) in FIG. 14). In the case of the file with a low rasterization complexity, the increase caused in the rasterization time by the decrease in the memory allocation to the rasterization process is smaller than the decrease caused in the decryption time by an increase in the memory allocation to the decryption process. Therefore, a result of comparison between (1) and (3) shows that the processing time in (1) is shorter. The decryption time in the authorization management server 20 is constant, regardless of increases and decreases in the memory allocation to the rasterization process. Therefore, a result of comparison between (2) and (4) shows that the processing time in (4) is shorter. For the file with a low rasterization complexity, the time required for the decryption time hardly change, regardless of whether the decryption process is performed by an image forming apparatus 30 or the authorization management server 20. The proportion of the file transmission and reception time to the decryption time in the authorization management server 20 becomes relatively large, and the decryption time in the authorization management server 20 becomes longer accordingly. A result of comparison between (1) and (4) shows that the processing time in (1) is shorter. In view of this, the processing time for the file with a low rasterization complexity can be minimized where the memory allocation to the rasterization process is not increased, and the image forming apparatus 30 performs decryption and rasterization in parallel.

In the case of a file with a high rasterization complexity, on the other hand, when the memory allocation to the rasterization process is reduced, the rasterization time becomes longer (the rasterization times in (5) and (6) are longer than those in (7) and (8) in FIG. 14), and the decryption time becomes shorter (the decryption time in (7) is shorter than that in (5) in FIG. 14). In the case of the file with a high rasterization complexity, the increase caused in the rasterization time by the decrease in the memory allocation to the rasterization process is larger than the decrease caused in the decryption time by an increase in the memory allocation to the decryption process. Therefore, a result of comparison between (5) and (7) shows that the processing time in (7) is shorter. The decryption time in the authorization management server 20 is constant, regardless of increases and decreases in the memory allocation to the rasterization process. Therefore, a result of comparison between (6) and (8) shows that the processing time in (8) is shorter. For the file with a high rasterization complexity, the proportion of the file transmission and reception time to the decryption time in the authorization management server 20 becomes relatively small, and the decryption time in the authorization management server 20 does not becomes much longer. A result of comparison between (7) and (8) shows that the processing time in (8) is shorter. In view of this, the processing time for the file with a high rasterization complexity can be minimized where the memory allocation to the rasterization process is increased, the authorization management server 20 performs the decryption process, and an image forming apparatus 30 performs the rasterization process.

FIGS. 15A through 15C show processing times in cases where the document to be printed is formed with chapters, and the chapters (Chapters 1 through 5 in this example) are successively processed. FIG. 15A shows an example case where an image forming apparatus 30 performs decryption and rasterization in parallel. FIG. 15B shows an example case where the authorization management server 20 performs a decryption process, and an image forming apparatus 30 performs a rasterization process. FIG. 15C shows an example case where the memory allocation and the decryption destination are changed during an operation.

In the case shown in FIG. 15A, the memory allocation to a rasterization process is not increased, and an image forming apparatus 30 performs decryption and rasterization in parallel. When the decryption process for Chapter 1 is completed, the rasterization process for Chapter 1 is started, and the decryption process for Chapter 2 is also started. If the decryption time for Chapter 2 is shorter than the rasterization time for Chapter 1, the decryption process for Chapter 3 is started immediately after the end of the decryption process for Chapter 2. However, the rasterization process for Chapter 1 has not been completed yet at that point of time, and therefore, the rasterization process for Chapter 2 cannot be started, resulting in a latency time. Likewise, at the respective points when the decryption processes for Chapters 4 and 5 are completed, the rasterization processes for Chapters 3 and 4 have not been completed yet, and therefore, the rasterization processes for Chapters 4 and 5 cannot be started, resulting in latency times. Particularly, the rasterization time for a Chapter with a high file complexity is long, and the latency time is also long. As a result, a long period of time is required for completing the processing of all the Chapters.

In the case shown in FIG. 15B, the memory allocation to a rasterization process is increased, the authorization management server 20 performs a decryption process, and an image forming apparatus 30 performs a rasterization process. When the decryption process for one Chapter is completed, the rasterization process for the Chapter can be started. If the decryption time for Chapter 3 is longer than the rasterization time for Chapter 2, the image forming apparatus 30 is ready to start the rasterization process for Chapter 3 when the rasterization process for Chapter 2 is completed. However, the decryption process for Chapter 3 has not been completed yet at that point of time, and therefore, the rasterization process for Chapter 3 cannot be started, resulting in a latency time. Furthermore, at the respective points when the decryption processes for Chapters 4 and 5 are completed, the rasterization processes for Chapters 3 and 4 have not been completed yet, and therefore, the rasterization processes for Chapters 4 and 5 cannot be started, resulting in latency times. In this case, the memory allocation to a rasterization process is increased, and the rasterization time for a Chapter with a high file complexity can be shortened accordingly. Thus, the latency times (the latency times before the rasterization processes for Chapters 4 and 5 are started) can be made shorter than those in the case shown in FIG. 15A. As a result, the time required for completing the processing of all the Chapters can be reduced by a small amount.

In the case shown in FIG. 15C, the memory allocation to a rasterization process and the decryption destination are changed during an operation. When processing for a Chapter with a high file complexity is started, the memory allocation to the rasterization process is increased, and the decryption destination is changed to the authorization management server 20. Thus, the processing time can be shortened. For example, in a case where the decryption destination is changed to the authorization management server 20 at the point when the decryption process for Chapter 2 is completed, the image forming apparatus 30 does not need to perform the decryption process, and the rasterization time for Chapter 3 and thereafter can be shortened accordingly. As a result, the latency times for the rasterization processes can be shortened, and the time required for completing the processing of all the Chapters can be shortened by a great amount.

As described so far, a rasterization complexity is calculated in accordance with file information added as metadata to encrypted data. The processing time required in a case where an image forming apparatus 30 performs decryption and rasterization in parallel, and the processing time required in a case where the authorization management server 20 performs a decryption process and an image forming apparatus 30 performs a rasterization process are calculated in accordance with CPU performance information, memory allocation information, the file information, and the rasterization complexity. In accordance with a result of comparison between the processing times, a decryption destination is determined. In this manner, printing performance can be improved, and the required print time can be shortened, no matter what kind of file is used as the print file from which an encrypted file is generated.

The present invention is not limited to the above-described embodiment, and any appropriate modifications can be made to the configuration and the control thereof, without departing from the scope of the present invention.

For example, in the above-described embodiment, a file that can be subjected to direct printing, such as a PDF file, is encrypted. However, an encrypted file printing method according to the present invention can also be used in a case where a page description language (PDL) file written in a page description language such as Printer Job Language (PJL), PostScript (PS), or Printer Control Language (PCL).

Furthermore, in the above-described embodiment, an encrypted file has authorization managed by RMS. However, an encrypted file printing method according to the present invention can also be used for encrypted files having authorization managed by some other technique and general encrypted files without any managed authorization.

Furthermore, in the above-described embodiment, rasterization processes are performed by an image forming apparatus 30. However, rasterization processes may be performed by the authorization management server 20.

The present invention can be used in an encrypted file printing system that performs printing after decrypting and rasterizing an encrypted file, an encrypted file printing method, an encrypted file print control program, and a recording medium storing the encrypted file print control program.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An encrypted file printing system comprising:
   a client terminal generating a print file;
   an authorization management server managing authorization of the print file; and
   an image forming apparatus performing printing of the print file,
   the client terminal, the authorization management server, and the image forming apparatus being connected by a communication network,
   wherein
   the authorization management server includes:
   a key generating unit generating an encryption key for the print file and a decryption key for an encrypted file generated by encrypting the print file; and
   a decrypting unit decrypting the encrypted file,
   the client terminal includes:
   an encrypting unit encrypting the print file and generating the encrypted file, using the encryption key obtained from the authorization management server; and
   a print instructing unit adding file information as metadata to the encrypted file, transmitting the file information to the image forming apparatus, the file information indicating a structure of the print file,
   the image forming apparatus includes:
   a decrypting unit decrypting the encrypted file;
   a rasterizing unit rasterizing the print file;
   a memory to be used by the decrypting unit and the rasterizing unit; and
   a control unit, and
   the control unit includes:
   a complexity calculating unit receiving the encrypted file, and reading the file information added to the encrypted file and calculating a rasterization complexity in the image forming apparatus in accordance with the file information before the decrypting unit decrypts the encrypted file;
   a processing time calculating unit calculating a first processing time in a first processing mode and a second processing time in a second processing mode in accordance with CPU performance information about the image forming apparatus and the authorization management server, information about an allocation of the memory to a rasterization process, the file information, and the rasterization complexity, the first processing mode being a mode where the image forming apparatus performs a decryption process and a rasterization process in parallel, the second processing mode being a mode where the authorization management server performs a decryption process and the image forming apparatus performs a rasterization process; and
   a decryption destination determining unit comparing the first processing time and the second processing time, and, in accordance with a result of the comparison, determining whether the image forming apparatus or the authorization management server is to perform a decryption process.

2. The encrypted file printing system according to claim 1, wherein
   the file information includes a file type and an object type of the print file, and
   the complexity calculating unit calculates the rasterization complexity in accordance with the file type and the object type.

3. The encrypted file printing system according to claim 1, wherein
   the file information includes the number of pages in the print file, and
   the processing time calculating unit calculates a first rasterization time in the first processing mode and a second rasterization time in the second processing mode, in accordance with the number of pages, the rasterization complexity, and a standard rasterization time corresponding to the allocation of the memory.

4. The encrypted file printing system according to claim 3, wherein
   the file information includes a file size of the print file, and
   the processing time calculating unit calculates a first decryption time in the first processing mode and a second decryption time in the second processing mode, in accordance with the file size.

5. The encrypted file printing system according to claim 4, wherein
   the processing time calculating unit calculates the first processing time by combining the first rasterization time, the first decryption time, and a time required for obtaining the decryption key from the authorization management server, and calculates the second processing time by combining the second rasterization time, the second decryption time, a time required for transmitting the encrypted file to the authorization management server, and a time required for receiving the decrypted print file from the authorization management server.

6. The encrypted file printing system according to claim 1, wherein
   the processing time calculating unit increases the allocation of the memory to the rasterization process in the second processing mode to a larger amount than the allocation of the memory to the rasterization process in the first processing mode.

7. An encrypted file printing method implemented in a system in which a client terminal that generates a print file, an authorization management server that manages authorization of the print file, and an image forming apparatus that performs printing of the print file are connected by a communication network, the encrypted file printing method comprising:
the authorization management server authorizing the print file in response to an authorization request from the client terminal, generating an encryption key for encrypting the print file, and transmitting the encryption key to the client terminal;
the client terminal receiving the encryption key from the authorization management server, creating an encrypted file by encrypting the print file using the encryption key, adding file information indicating a structure of the print file as metadata to the encrypted file, and transmitting the encrypted file to the image forming apparatus;
the image forming apparatus
receiving the encrypted file, and reading the file information added to the encrypted file and calculating a rasterization complexity in the image forming apparatus in accordance with the file information before the encrypted file is decrypted;
calculating a first processing time in a first processing mode and a second processing time in a second processing mode in accordance with CPU performance information about the image forming apparatus and the authorization management server, information about an allocation of a memory to a rasterization process, the file information, and the rasterization complexity, the first processing mode being a mode where the image forming apparatus performs a decryption process and a rasterization process in parallel, the second processing mode being a mode where the authorization management server performs a decryption process and the image forming apparatus performs a rasterization process; and
comparing the first processing time and the second processing time, and, in accordance with a result of the comparison, determining whether the image forming apparatus or the authorization management server is to perform a decryption process;
the authorization management server transmitting a decryption key for decrypting the encrypted file when receiving an authorization check request from the image forming apparatus, and decrypting the encrypted file and transmitting the decrypted print file to the image forming apparatus when receiving the encrypted file from the image forming apparatus; and
the image forming apparatus performing a rasterization process on the print file decrypted by the image forming apparatus or the authorization management server.

8. The encrypted file printing method according to claim 7, wherein
the file information includes a file type and an object type of the print file, and
the image forming apparatus calculates the rasterization complexity in accordance with the file type and the object type.

9. The encrypted file printing method according to claim 7, wherein
the file information includes the number of pages in the print file, and
the image forming apparatus calculates a first rasterization time in the first processing mode and a second rasterization time in the second processing mode, in accordance with the number of pages, the rasterization complexity, and a standard rasterization time corresponding to the allocation of the memory.

10. The encrypted file printing method according to claim 9, wherein
the file information includes a file size of the print file, and
the image forming apparatus calculates a first decryption time in the first processing mode and a second decryption time in the second processing mode, in accordance with the file size.

11. The encrypted file printing method according to claim 10, wherein
the image forming apparatus calculates the first processing time by combining the first rasterization time, the first decryption time, and a time required for obtaining the decryption key from the authorization management server, and calculates the second processing time by combining the second rasterization time, the second decryption time, a time required for transmitting the encrypted file to the authorization management server, and a time required for receiving the decrypted print file from the authorization management server.

12. The encrypted file printing method according to claim 7, wherein
the image forming apparatus increases the allocation of the memory to the rasterization process in the second processing mode to a larger amount than the allocation of the memory to the rasterization process in the first processing mode.

13. A non-transitory recording medium storing a computer readable encrypted file print control program to be executed in an image forming apparatus in a system in which a client terminal that generates a print file, an authorization management server that manages authorization of the print file, and the image forming apparatus that performs printing of the print file are connected by a communication network,
the encrypted file print control program causing a control unit of the image forming apparatus to perform:
a first process to receive, from the client terminal, an encrypted file generated by encrypting the print file with an encryption key generated by the authorization management server, and receive file information added as metadata to the encrypted file, the file information indicating a structure of the print file;
a second process to read the file information added to the encrypted file and calculate a rasterization complexity in the image forming apparatus in accordance with the file information before the encrypted file is decrypted;
a third process to calculate a first processing time in a first processing mode and a second processing time in a second processing mode in accordance with CPU performance information about the image forming apparatus and the authorization management server, information about an allocation of a memory to a rasterization process, the file information, and the rasterization complexity, the first processing mode being a mode where the image forming apparatus performs a decryption process and a rasterization process in parallel, the second processing mode being a mode where the authorization management server performs a decryption process and the image forming apparatus performs a rasterization process; and a fourth process to compare the first processing time and the second processing time, and, in accordance with a result of the comparison, determine whether the image forming apparatus or the authorization management server is to perform a decryption process.

14. The non-transitory recording medium storing a computer readable encrypted file print control program according to claim 13, wherein the file information includes a file type and an object type of the print file, and, in the second process, the rasterization complexity is calculated in accordance with the file type and the object type.

15. The non-transitory recording medium storing a computer readable encrypted file print control program according to claim 13, wherein the file information includes the number of pages in the print file, and, in the third process, a first rasterization time in the first processing mode and a second rasterization time in the second processing mode are calculated in accordance with the number of pages, the rasterization complexity, and a standard rasterization time corresponding to the allocation of the memory.

16. The non-transitory recording medium storing a computer readable encrypted file print control program according to claim 15, wherein the file information includes a file size of the print file, and, in the third process, a first decryption time in the first processing mode and a second decryption time in the second processing mode are calculated in accordance with the file size.

17. The non-transitory recording medium storing a computer readable encrypted file print control program according to claim 16, wherein, in the third process, the first processing time is calculated by combining the first rasterization time, the first decryption time, and a time required for obtaining the decryption key from the authorization management server, and the second processing time is calculated by combining the second rasterization time, the second decryption time, a time required for transmitting the encrypted file to the authorization management server, and a time required for receiving the decrypted print file from the authorization management server.

18. The non-transitory recording medium storing a computer readable encrypted file print control program according to claim 13, wherein, in the third process, the allocation of the memory to the rasterization process in the second processing mode is increased to a larger amount than the allocation of the memory to the rasterization process in the first processing mode.

* * * * *